(12) United States Patent
Kuga

(10) Patent No.: US 11,829,620 B2
(45) Date of Patent: Nov. 28, 2023

(54) INFORMATION PROCESSING APPARATUS AND CONTROL METHOD

(71) Applicant: CANON KABUSHIKI KAISHA, Tokyo (JP)

(72) Inventor: Takeshi Kuga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 17/582,037

(22) Filed: Jan. 24, 2022

(65) Prior Publication Data
US 2022/0261163 A1 Aug. 18, 2022

(30) Foreign Application Priority Data
Feb. 12, 2021 (JP) .................. 2021-020364

(51) Int. Cl.
*G06F 3/06* (2006.01)
*G06F 12/02* (2006.01)

(52) U.S. Cl.
CPC .......... *G06F 3/0631* (2013.01); *G06F 3/0604* (2013.01); *G06F 3/0659* (2013.01); *G06F 3/0679* (2013.01); *G06F 12/0246* (2013.01)

(58) Field of Classification Search
None
See application file for complete search history.

(56) References Cited

U.S. PATENT DOCUMENTS 5,864,738 A * 1/1999 Kessler ............... G06F 12/0817
709/239
2016/0350241 A1 12/2016 Akira et al.

FOREIGN PATENT DOCUMENTS

JP 6548459 B2 7/2019

* cited by examiner

*Primary Examiner* — Stephanie Wu
(74) *Attorney, Agent, or Firm* — Venable LLP

(57) ABSTRACT

There is provided a technique to enable a specific IC chip to reliably activate the other IC chips. An information processing apparatus has first to third IC chips and, after loading an activation program for the third IC chip from a first storage unit connected to the first IC chip into a third storage unit connected to the third IC chip, accesses a register and activates the third control unit.

16 Claims, 22 Drawing Sheets

FIG. 2A (210)

| Address range | Region |
|---|---|
| 0xFFFF_FFFF – 0xF000_0000 | ROM (217) |
| 0xA1FF_FFFF – 0xA000_0000 | CPU RESET SETTING REGISTER (216) |
| 0x81FF_FFFF – 0x8000_0000 | MEMORY CONTROLLER SETTING REGISTER (215) |
| 0x71FF_FFFF – 0x7000_0000 | PLL SETTING REGISTER (214) |
| 0x5FFF_FFFF – 0x5000_0000 | PCIe (Ch1) FOR ADDRESS CONVERSION (213) |
| 0x4FFF_FFFF – 0x4000_0000 | PCIe (Ch0) FOR ADDRESS CONVERSION (212) |
| 0x3FFF_FFFF – 0x0000_0000 | RAM (211) |

FIG. 2B (220)

| Address range | Region |
|---|---|
| 0xFFFF_FFFF – 0xF000_0000 | ROM (227) |
| 0xA1FF_FFFF – 0xA000_0000 | CPU RESET SETTING REGISTER (226) |
| 0x81FF_FFFF – 0x8000_0000 | MEMORY CONTROLLER SETTING REGISTER (225) |
| 0x71FF_FFFF – 0x7000_0000 | PLL SETTING REGISTER (224) |
| 0x5FFF_FFFF – 0x5000_0000 | PCIe (Ch1) FOR ADDRESS CONVERSION (223) |
| 0x4FFF_FFFF – 0x4000_0000 | PCIe (Ch0) FOR ADDRESS CONVERSION (222) |
| 0x3FFF_FFFF – 0x0000_0000 | RAM (221) |

FIG. 2C (230)

| Address range | Region |
|---|---|
| 0xFFFF_FFFF – 0xF000_0000 | ROM (237) |
| 0xA1FF_FFFF – 0xA000_0000 | CPU RESET SETTING REGISTER (236) |
| 0x81FF_FFFF – 0x8000_0000 | MEMORY CONTROLLER SETTING REGISTER (235) |
| 0x71FF_FFFF – 0x7000_0000 | PLL SETTING REGISTER (234) |
| 0x5FFF_FFFF – 0x5000_0000 | PCIe (Ch1) FOR ADDRESS CONVERSION (233) |
| 0x4FFF_FFFF – 0x4000_0000 | PCIe (Ch0) FOR ADDRESS CONVERSION (232) |
| 0x3FFF_FFFF – 0x0000_0000 | RAM (231) |

FIG. 2D (240)

| Address range | Region |
|---|---|
| 0xFFFF_FFFF – 0xF000_0000 | ROM (247) |
| 0xA1FF_FFFF – 0xA000_0000 | CPU RESET SETTING REGISTER (246) |
| 0x81FF_FFFF – 0x8000_0000 | MEMORY CONTROLLER SETTING REGISTER (245) |
| 0x71FF_FFFF – 0x7000_0000 | PLL SETTING REGISTER (244) |
| 0x5FFF_FFFF – 0x5000_0000 | PCIe (Ch1) FOR ADDRESS CONVERSION (243) |
| 0x4FFF_FFFF – 0x4000_0000 | PCIe (Ch0) FOR ADDRESS CONVERSION (242) |
| 0x3FFF_FFFF – 0x0000_0000 | RAM (241) |

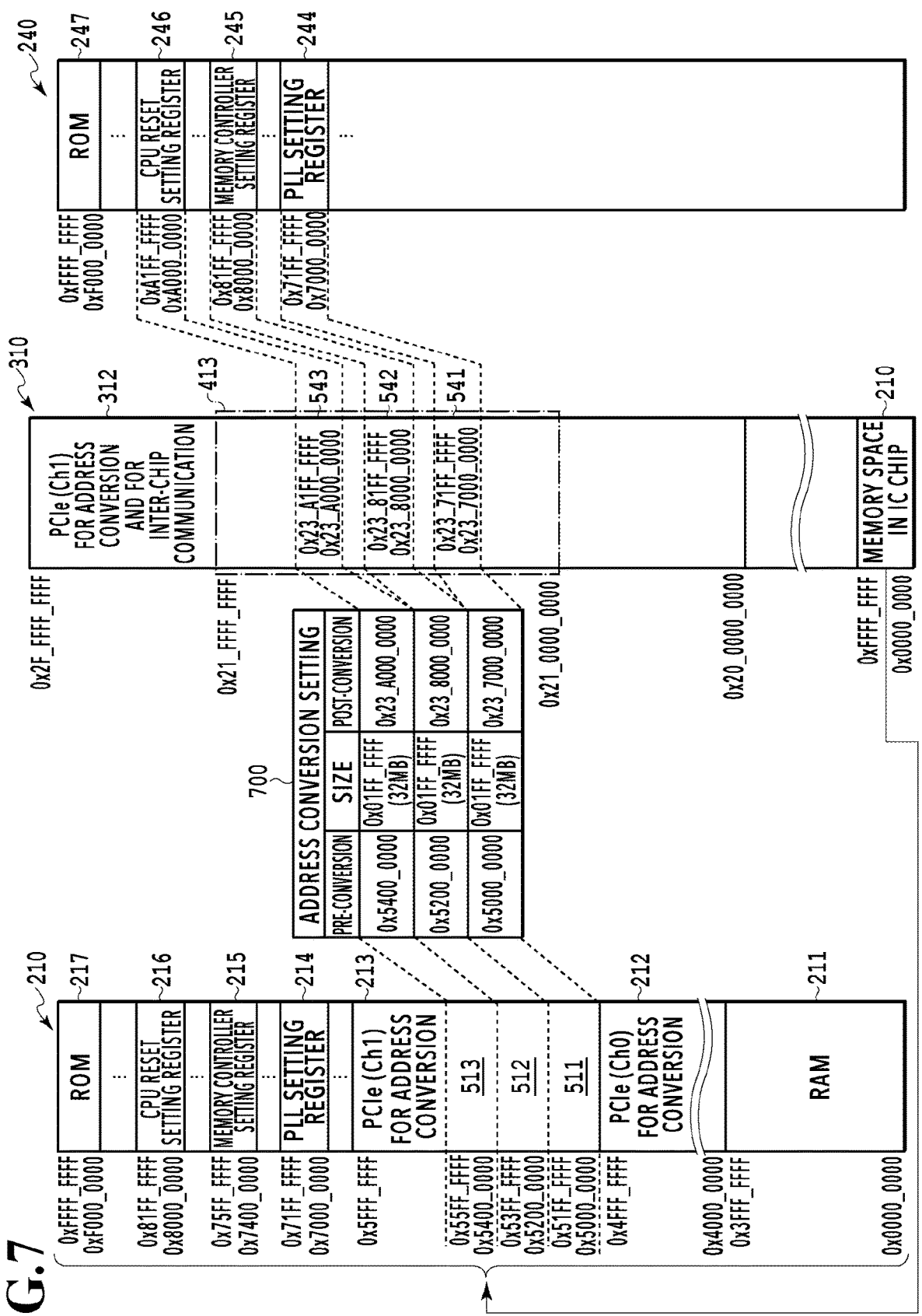

INFORMATION PROCESSING APPARATUS AND CONTROL METHOD

BACKGROUND

Field

The present disclosure relates to an information processing apparatus comprising a multi-chip module including two or more integrated circuit chips and a control method.

Description of the Related Art

Japanese Patent No. 6548459 discloses a technique of a multi-chip module having a plurality of integrated circuit chips (IC chips) connected in series, wherein a specific IC chip can access all the memory spaces of the other IC chips. More specifically, the specific IC chip which activates the other IC chips allocates memory spaces for accessing the other IC chips to the respective IC chips and set address conversion in units of allocation so as to access each IC chip. Control registers of each IC chip are concentrated in a specific area such that the specific IC chip can easily access the other IC chips even with limited address conversion resources.

Incidentally, in recent years, there is a case where an ASIC is developed by a combination of a common platform provided by a semiconductor vendor and a user-developed block in order to shorten development times. In this case, addresses of control registers accessed at the time of initialization are distant from each other in a memory space. Accordingly, it is necessary to set address conversion in detail using a number of address conversion resources. That is, in this case, there is a possibility that the specific IC chip cannot activate the other IC chips with limited address conversion resources.

SUMMARY

The present disclosure has been accomplished in consideration of the above problem. The object of the present disclosure is to provide a technique to enable a specific IC chip to reliably activate the other IC chips.

In the first aspect of the present disclosure, there is provided an information processing apparatus including:
a first storage unit storing an activation program;
a first IC chip connected to the first storage unit;
a second IC chip connected to the first IC chip; and
a third IC chip connected to the second IC chip,
wherein the first IC chip comprises:
a first control unit configured to control the first IC chip;
a first communication unit configured to communicate with the second IC chip; and
a first address conversion unit configured to convert an address of access transferred from the first control unit into an address of a memory space for communication based on a setting,
the second IC chip comprises:
a second control unit configured to control the second IC chip;
a second communication unit configured to communicate with the first IC chip;
a third communication unit configured to communicate with the third IC chip; and
a second address conversion unit configured to convert an address of access transferred. from the first control unit into an address of a memory space for communication based on a setting,
the third IC chip comprises:
a third control unit configured to control the third IC chip; and
a fourth communication unit configured to communicate with the second IC chip,
the first control unit makes a setting of the first address conversion unit so as to enable access to a register in a memory space of the second IC chip necessary for activation,
the first control unit uses the first communication unit and the second communication unit to load an activation program for the second IC chip from the first storage unit into a second storage unit connected to the second IC chip, then accesses the register, and activates the second control unit,
the first control unit further changes a setting of the first address conversion unit and the second address conversion unit so as to enable access to a register in a memory space of the third IC chip necessary for activation, and
the first control unit uses the first, second, third, and fourth communication units to load an activation program for the third IC chip from the first storage unit connected to the first IC chip into a third storage unit connected to the third chip, then accesses the register, and activates the third control unit.

In the second aspect of the present disclosure, there is provided a control method executed in an information processing apparatus, the information processing apparatus including:
a first storage unit storing an activation program;
a first IC chip connected to the first storage unit;
a second IC chip connected to the first. IC chip; and
a third IC chip connected to the second IC chip,
wherein the first IC chip comprises:
a first control unit configured to control the first IC chip;
a first communication unit configured to communicate with the second IC chip; and
a first address conversion unit configured to convert an address of access transferred from the first control unit into an address of a memory space for communication based on a setting,
the second IC chip comprises:
a second control unit configured to control the second IC chip;
a second communication unit configured to communicate with the first IC chip;
a third communication unit configured to communicate with the third IC chip; and
a second address conversion unit configured to convert an address of access transferred from the first control unit into an address of a memory space for communication based on a setting,
the third IC chip comprises:
a third control unit configured to control the third IC chip; and
a fourth communication unit configured to communicate with the second IC chip, and
the control method comprises:
by the first control unit, making a setting of the first address conversion unit so as to enable access to a register in a memory space of the second IC chip necessary for activation;
by the first control unit, using the first communication unit and the second communication unit to load an activation program for the second IC chip from the first storage unit into a second. storage unit connected to the second IC chip, then accessing the register, and activating the second control unit;

by the first control unit, further changing a setting of the first address conversion unit and the second address conversion unit so as to enable access to a register in a memory space of the third IC chip necessary for activation; and by the first control unit, using the first, second, third, and fourth communication units to load an activation program for the third IC chip from the first storage unit connected to the first IC chip into a third storage unit connected to the third IC chip, then accesses the register, and activates the third control unit.

In the third aspect of the present disclosure, there is provided an information processing apparatus including:

a first storage unit storing an activation program;
a first IC chip connected to the first storage unit;
a second IC chip connected to the first IC chip; and
a third IC chip connected to the second IC chip,
wherein the first IC chip comprises:
a first control unit configured to control the first IC chip;
a first communication unit configured to communicate with the second IC chip; and
a first address conversion unit configured to convert an address of access transferred from the first control unit into an address of a memory space for communication based on a setting,
the second IC chip comprises:
a second control unit configured to control the second IC chip;
a second communication unit configured to communicate with the first IC chip; and
a third communication unit configured to communicate with the third IC chip,
the third IC chip comprises:
a third control unit configured to control the third IC chip;
a fourth communication unit configured to communicate with the second IC chip; and
a second address conversion unit configured to convert an address of access transferred from the first control unit into an address of a memory space for communication based on a setting,
the first control unit makes a setting of the first address conversion unit so as to enable access to a register in a memory space of the second IC chip necessary for activation,
the first control unit uses the first communication unit and the second communication unit to load an activation program for the second IC chip from the first storage unit into a second storage unit connected to the second IC chip, then accesses the register, and activates the second control unit,
the first control unit further changes a setting of the first address conversion unit and the second address conversion unit so as to enable access to a register in a memory space of the third IC chip necessary for activation, and
the first control unit uses the first, second, third, and fourth communication units to load an activation program for the third IC chip from the first storage unit connected to the first IC chip into a third storage unit connected to the third IC chip, then accesses the register, and activates the third control unit.

According to the present disclosure, a specific IC chip can reliably activate the other IC chips.

Further features of the present disclosure will become apparent from the following description of exemplary embodiments with reference to the attached drawings.

BRIEF DESCRIPTION OF THE DRAWINGS

FIG. 1 is a diagram showing a relation between FIGS. 1A and 1B;

FIGS. 2A to 2D are diagrams showing mapping of memory spaces viewed from CPUs of respective IC chips;

FIG. 7 is a diagram showing a method of accessing an IC chip 40 from the CPU of the IC chip 10;

FIG. 8 is a diagram showing a relation between FIGS. 8A and 8B;

FIG. 9 is a diagram showing a relation between FIGS. 9A and 9B;

FIG. 10 is a diagram showing a relation between FIGS. 10A and 10B;

FIG. 11 is a diagram showing a relation between FIGS. 11A and 1B;

FIG. 12 is a diagram showing a relation between FIGS. 12A and 12B;

FIG. 13 is a diagram showing a relation between FIGS. 13A and 13B;

FIG. 14 is a diagram showing a relation between FIGS. 14A and 14B;

DESCRIPTION OF THE EMBODIMENTS

An example of embodiments of an information processing apparatus and a control method will be hereinafter described in detail with reference to the accompanying drawings. The embodiments described below do not limit the present disclosure and not all combinations of features described in the embodiments are necessarily essential for solving the problem to be solved by the present disclosure. The relative positions, shapes, and the like of constituent elements described in the embodiments are merely shown as examples and the scope of the present disclosure is not limited to only these examples unless otherwise specified.

In the following description, the term "print" encompasses not only the case of forming significant information such as characters or graphics but also the case of forming a wide variety of information such as an image, design, or pattern on a print medium or processing a medium regardless of whether it is significant or insignificant. Furthermore, the term "print" can be used irrespective of whether printed information manifests so as to be visually recognized by a human. Moreover, although paper used in a general printing apparatus is assumed as a "print medium" in the embodiments, the term "print medium" also indicates a medium capable of receiving ink such as cloth, plastic film, metal, glass, ceramic, wood, or leather.

The term "ink" should also be interpreted broadly like the above definition of "print." Accordingly, "ink" indicates an liquid that can be provided on a print medium to thereby form an image, design, pattern, and the like, process the print medium, or process ink (e.g., coagulate or insolubilize a color material in ink provided on the print medium).

First Embodiment

Figure 1A:
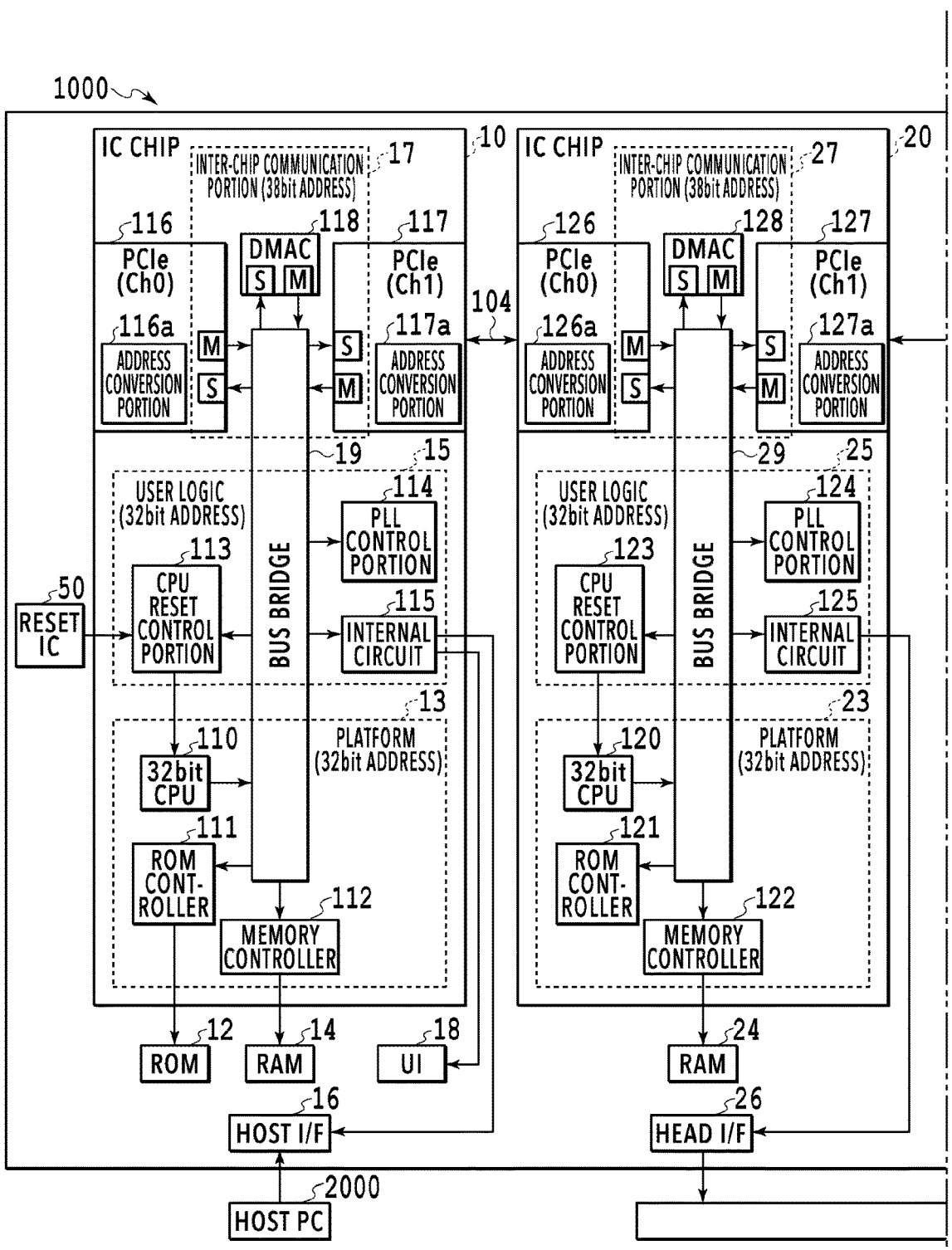
FIGS. 1A and 1B are block configuration diagrams of an information processing apparatus in an inkjet printing apparatus.
Figure 1B:
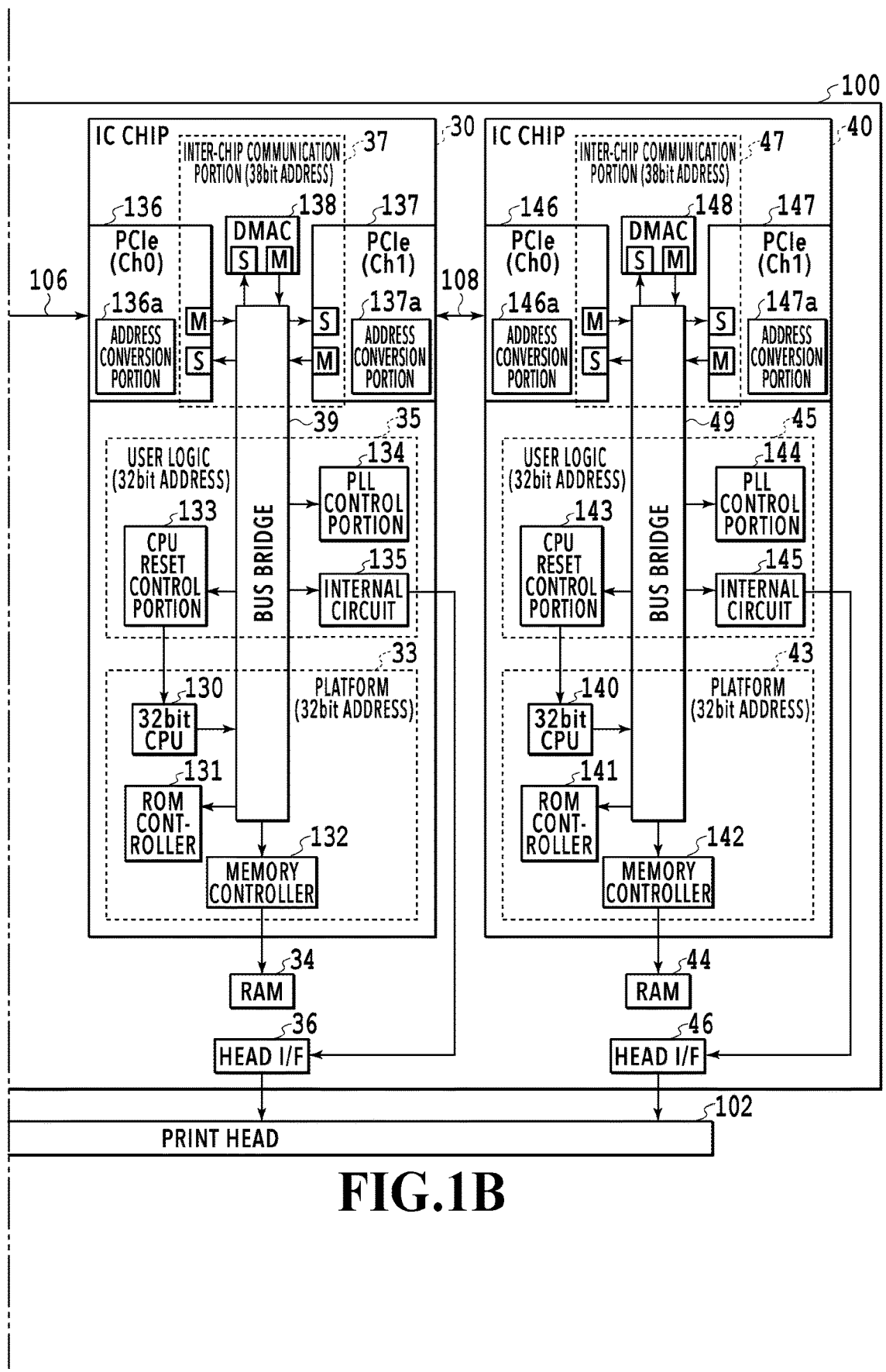

First, an information processing apparatus according to a first embodiment will be described with reference to FIG. 1A to FIG. 9B. In this specification, an information processing apparatus in an inkjet printing apparatus (hereinafter also referred to as "printing apparatus" as appropriate) which provides ink on a print medium and performs printing is described as an example. In the printing apparatus, the information processing apparatus controls ink ejection from a print head based on input image data. FIGS. 1A and 1B are block configuration diagrams of the information processing apparatus in the inkjet printing apparatus.

A printing apparatus 1000 provided with an information processing apparatus 100 comprises a conveying mechanism (not shown) which conveys a print medium and a scanning mechanism (not shown) which reciprocally moves a carriage (not shown) equipped with a print head 102 in a direction crossing a conveying direction of a print medium. The printing apparatus 1000 also comprises a recovery mechanism (not shown) which performs various kinds of processing to maintain and recover a good ejection state of ink from the print head. Since the conveying mechanism, the print head, the scanning mechanism, and the recovery mechanism can be configured using various publicly known techniques, the detailed description thereof is omitted. The printing apparatus 1000 is connected to a separately-provided host computer (host PC) 2000 to receive input of various kinds of information such as image data from the host computer 2000.

Configuration of Information Processing Apparatus

The information processing apparatus 100 comprises a plurality of IC chips connected in series. In the present embodiment, a description will be given of a case where the information processing apparatus 100 comprises four IC chips 10, 20, 30, and 40. However, the number of IC chips provided is not limited to four and may be two, three, or five or more.

The IC chip 10 performs interface processing with the host PC 2000. The IC chips 20, 30, and 40 perform processing of outputting, to the print head 102, print data obtained by executing image processing for image data. The IC chip 10 is connected to the IC chip 20 by PCI-Express (hereinafter referred to as "PCIe") 104. The IC chip 20 is connected to the IC chip 10 by the PCIe 104 and to the IC chip 30 by PCIe 106. The IC chip 30 is connected to the IC chip 20 by the PCIe 106 and to the IC chip 40 by PCIe 108.

The IC chip 40 is connected to the IC chip 30 by the PCIe 108. The IC chips 10, 20, 30, and 40 are thus connected in series.

The IC chip 10 is connected to a ROM 12, a RAM 14, a host interface (I/F) 16, a user interface (UI) 18, and a reset IC 50. The ROM 12 stores various kinds of information such as activation programs for the IC chips 10, 20, 30, and 40. The RAM 14 is used as a work area of the IC chip 10 for example. The host I/F 16 is an interface which communicates with the host PC 2000. The UI 18 includes, for example, an operation panel with a switch, a liquid crystal display (LCD), and a light emitting diode (LED) lamp. The UI 18 enables a user to input various instructions to the printing apparatus 1000 and notifies a user of various kinds of information about the printing apparatus 1000. The reset IC 50 performs reset control of the IC chip 10.

The IC chip 20 is connected to a RAM 24 and a head I/F 26. The IC chip 30 is connected to a RAM 34 and a head I/F 36. The IC chip 40 is connected to a RAM 44 and a head I/F 46. The RAMs 24, 34, and 44 are used as work areas of the respective connected IC chips for example. The head I/Fs 26, 36, and 46 are connected to the print head 102. As will be described later in detail, the activation and reset control of the IC chips 20, 30, and 40 are executed by the IC chip 10.

The IC chip 10 reads a control program stored in the ROM 12 and executes the control program, for example, using the RAM 14 as a work area. More specifically, the IC chip 10 performs interface processing with the host PC 2000, controls the entire printing apparatus 1000, controls the UI 18, and controls various drive mechanisms. The RAM 14 is also used as a storage area for temporarily storing image data transferred from the host PC 2000.

The IC chips 20, 30, and 40 perform image processing such as conversion of multi-valued data into binary data and masking processing, drive control of the print head 102, and the like. The IC chips 20, 30, and 40 receive allocation of image data of color components generated for respective color inks ejected from the print head 102 and perform image processing for the image data. For example, in a case where the print head 102 is configured to eject inks of twelve colors, image data is divided into color component data corresponding to twelve colors. The division of image data may be performed by the host PC 2000 or the IC chip 10. The inks of twelve colors are, for example, matte black, photo black, cyan, magenta, yellow, photo cyan, photo magenta, gray, photo gray, red, blue, and chroma optimizer. Image processing of color component data corresponding to the twelve colors is allocated to the IC chips 20, 30, and 40 such that color component data corresponding to four colors is allocated to each IC chip.

The above allocation of color component data is an example and may be modified depending on the specification of the print head 102 and the performance of the IC chips. For example, in a case where one of the IC chips 20, 30, and 40 supports inks of six colors, image processing of color component data corresponding to six colors is allocated to that IC chip and image processing of color component data corresponding to three colors is allocated to each of the other two IC chips. Alternatively, common image processing for all the color components may be allocated to the IC chip 20 and image processing of color component data corresponding to six colors may be allocated to each of the IC chips 30 and 40.

Configuration of IC Chip

Next, the internal configuration of the IC chips 10, 20, 30, and 40 will be described. In the present embodiment, each IC chip has the same configuration except for other internal constituent elements (described later) and uses a CPU of 32-bit architecture.

More specifically, the IC chip 10 comprises an area 13 where a platform capable of 32-bit addressing is present and an area 15 where a user logic capable of 32-bit addressing is present. The IC chip 10 also comprises an area 17 of an inter-chip communication portion where a block capable of 38-bit addressing via a bus bridge 19 is present. These three areas 13, 15, and 17 are connected via the bus bridge 19.

The area 13 where the platform is present is a block equipped with a processor and a memory controller for common use in a number of systems and provided by a semiconductor vendor. The area 15 where the user logic is present is a block equipped with a product-specific function by a developer of the printing apparatus 1000. The area 17 of the inter-chip communication portion is a block which communicates with the other IC chips and a designer thereof may be the semiconductor vendor, the developer of the printing apparatus 1000, or a third party.

Like the IC chip 10, the IC chips 20, 30, and 40 comprise areas 23, 33, and 43 where the above platform is present, areas 25, 35, and 45 where the above user logic is present, and areas 27, 37, and 47 of the above inter-chip communication portion, respectively. In the IC chips 20, 30, and 40, the areas are connected via bus bridges 29, 39, and 49.

Since the main configurations of the IC chips 10, 20, 30, and 40 are the same, the configuration of the IC chip 10 will be described below and a description of the IC chips 20, 30, and 40 will be omitted. In FIGS. 1A and 1B, corresponding constituent elements of the respective IC chips are denoted by reference numerals with different digits at their tens places (the same applies to the other drawings).

The IC chip 10 comprises, in the area 13, a 32-bit CPU 110 as a central processing unit, a ROM controller 111 which communicates with the ROM 12, and a memory controller (memory control portion) 112 which communicates with the RAM 14.

The IC chip 10 comprises, in the area 15, a CPU reset control portion 113 which releases the CPU 110 from reset under control of the reset IC 50 and a phase-locked loop (PLL) control portion 114 which performs multiplication control of a clock in the IC chip 10. In the area 15, other internal constituent elements such as a communication circuit which communicates with the host I/F 16 and the UI 18 are collectively shown as an internal circuit 115. In the IC chips 20, 30, and 40, internal circuits corresponding to the above internal circuit 115 have communication circuits which communicate with the head I/Fs 26, 36, and 46, respectively, instead of the above communication circuit.

The IC chip 10 comprises, in the area 17, PCIe (Ch0: channel 0) 116 and PCIe (Ch1: channel 1) 117 which communicate with the other IC chips. The PCIe (Ch0) 116 is provided with an address conversion portion 116a and the PCIe (Ch1) 117 is provided with an address conversion portion 117a. The IC chip 10 also comprises, in the area 17, a direct memory access controller (DMAC) 118 which performs data transfer from/to the other IC chips. In the PCIe (Ch0) 116, the PCIe (Ch1) 117, and the DMAC 118 shown in FIG. 1A, sign "M" indicates "Master" and sign "S" indicates "Slave." "Master" takes the initiative in the bus bridge 19 and makes write/read access to "Slave." In the present embodiment, the PCIe (Ch0) and the PCIe (Ch1) function as communication portions which connect the IC chips so as to communicate with each other.

Memory Space of IC Chip

Figure 3:
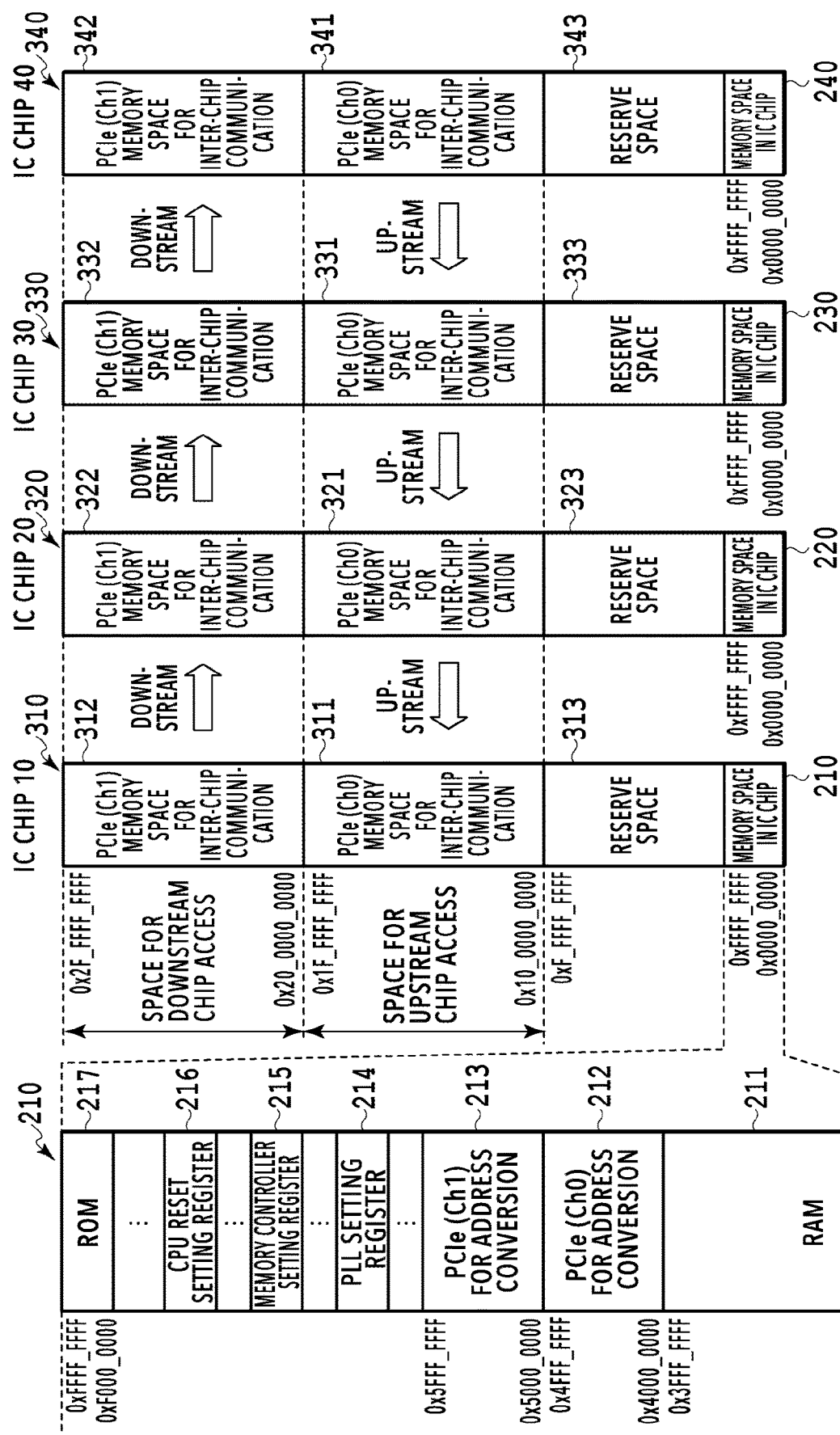
FIG. 3 is a diagram showing mapping of the entire memory spaces and a method of accessing the other IC chips.

Next, a memory space of the IC chip will be described. FIGS. 2A to 2D are diagrams showing an example of mapping of memory spaces viewed from the CPUs of the respective IC chips. FIG. 2A shows an example of mapping of a memory space 210 viewed from the CPU 110 of the IC chip 10. FIG. 2B shows an example of mapping of a memory space 220 viewed from the CPU 120 of the IC chip 20. FIG. 2C shows an example of mapping of a memory space 230 viewed from the CPU 130 of the IC chip 30. FIG. 2D shows an example of mapping of a memory space 240 viewed from the CPU 140 of the IC chip 40. FIG. 3 is a diagram showing mapping of the entire memory spaces and a method of accessing the other IC chips.

The mapping of the memory space viewed from the CPU of the IC chip is as shown in FIGS. 2A to 2D. Since the mapping of the memory space is the same in all the IC chips, only the IC chip 10 will be described below and a description of the IC chips 20, 30, and 40 will be omitted.

The memory space 210 viewed from the CPU 110 of the IC chip 10 has an area 211 that is a storage area of the RAM 14 for program execution and data storage. The memory space 210 also has an area 212 that is a slave address space of the PCIe (Ch0) 116 and an area 213 that is a slave address space of the PCIe (Ch1) 117. These areas 212 and 213 are memory spaces for address conversion and are accessed at the time of address conversion. The area 213 will also be referred to as a slave address space 213. The memory space 210 also has an area 214 that is a PLL setting register which makes a setting of the PLL control portion 114 and an area 215 that is a memory controller setting register which makes a setting of the main controller 112. The memory space 210 further has an area 216 that is a CPU reset setting register which makes a setting of the CPU reset control portion 113 and an area 217 that is a storage area of the ROM 12 for program reading.

The memory space viewed from the CPU of each IC chip shown in FIGS. 2A to 2D is included in mapping of the entire memory space of each IC chip as shown in FIG. 3. In FIG. 3, a memory space 310 indicates the entire memory space of the IC chip 10, a memory space 320 indicates the entire memory space of the IC chip 20, a memory space 330 indicates the entire memory space of the IC chip 30, and a memory space 410 indicates the entire memory space of the IC chip 40. In the memory space 310, an area 311 is a slave address space of the PCIe (Ch0) 116, an area 312 is a slave address space of the PCIe (Ch1) 117, and an area 313 is a reserve space to which nothing is allocated.

The areas 311 and 312 are memory spaces for communication between the IC chips and are accessed at the time of communication between the IC chips. In the memory spaces 320, 330, and 340, areas 321, 331, and 341 are slave address spaces of the PCIe (Ch0) 116, areas 322, 332, and 342 are slave address spaces of the PCIe (Ch1) 117, and areas 323, 333, and 343 are reserve spaces. In the following description, the area 312 will also be referred to as a slave address space 312 or a memory space 312.

Method of Accessing Memory Spaces of Other IC Chips

Figure 4:
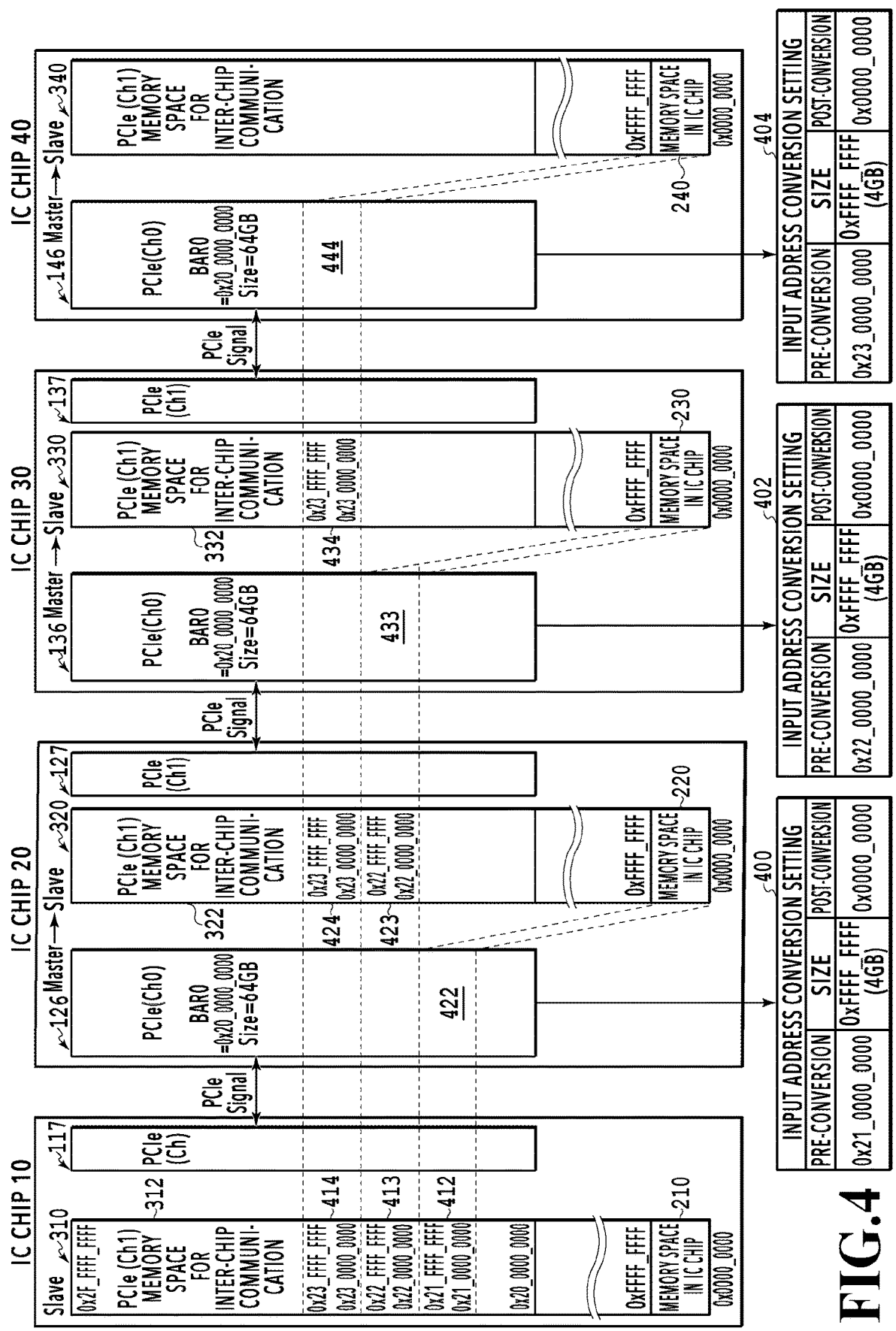
FIG. 4 is a diagram showing downstream memory space mapping viewed from an IC chip 10.

Next, a method of accessing the memory spaces of the other IC chips will be described. FIG. 4 is a diagram showing downstream memory space mapping viewed from the IC chip 10. In FIG. 4, in the memory space 310 of the IC chip 10, areas 412, 413, and 414 of the area 312 of the PCIe (Ch1) 117 are allocated to spaces to access the downstream chips, that is, the IC chips 20, 30, and 40. In the memory space 320 of the IC chip 20, areas 424 and 423 of the memory space 322 of the PCIe 117 are allocated to spaces to access the downstream chips, that is, the IC chips 30 and 40. In the memory space 330 of the IC chip 30, an area 434 of the memory space 332 of the PCIe 117 is allocated to a space to access the downstream chip, that is, the IC chip 40.

In the case of accessing the memory space 320 of the IC chip 20 from the IC chip 10, access to the area 412 out of the memory space 310 of the IC chip 10 leads to access to the area 422 of the PCIe (Ch0) 126 of the IC chip 20. Accordingly, the area 422 is an area to access the IC chip 20. Here, the address conversion portion 126a (see FIG. 1A) of the PCIe (Ch0) 126 performs input address conversion, whereby an address of the access to the area 422 is converted into an address of the memory space 220 viewed from the CPU 120 in the memory space 320 of the IC chip 20. In the input address conversion by the address conversion portion 126a, for example, processing is based on a set input address conversion setting 400. Thus, the address conversion portion 126a converts an address value associated with data output from the IC chip 10 based on a setting such as the input address conversion setting 400.

In the case of accessing the memory space 330 of the IC chip 30 from the IC chip 10, access to the area 413 out of the memory space 310 of the IC chip 10 leads to access to the PCIe (Ch0) 126 of the IC chip 20. In the address conversion portion 126a of the PCIe (Ch0) 126, no address conversion is performed. Thus, the area 423 of the memory space 322 of the PCIe (Ch0) 127 in the memory space 320 of the IC chip 20 is accessed. Incidentally, the IC chip 20 comprises an address conversion portion 127a and can convert an address of access transferred from the CPU 110 into an address of a memory space for communication based on a setting. The access to the area 423 leads to access to an area 433 of the PCIe (Ch0) 136 of the IC chip 30. Accordingly, the area 433 is an area to access the IC chip 30. An address conversion portion 136a (see FIG. 1B) of the PCIe (Ch0) 136 performs input address conversion, whereby an address of the access to the area 433 is converted into an address of the memory space 230 viewed from the CPU 130 in the memory space 330 of the IC chip 30. In the input address conversion by the address conversion portion 136a, for example, processing is based on a set input address conversion setting 402. Thus, the address conversion portion 136a converts an address value associated with data output from the IC chip 10 based on a setting such as the input address conversion setting 402.

In the case of accessing the memory space 340 of the IC chip 40 from the IC chip 10, access to the area 414 out of the memory space 310 of the IC chip 10 leads to access to the PCIe (Ch0) 126 of the IC chip 20. In the address conversion portion of the PCIe (Ch0) 126, no address conversion is performed. Thus, the area 424 of the memory space 322 of the PCIe (Ch0) 127 in the memory space 320 of the IC chip 20 is accessed. The access to the area 424 leads to access to the PCIe (Ch0) 136 of the IC chip 30. Accordingly, the area 424 is an area to access the IC chip 40. In the address conversion portion 136a of the PCIe (Ch0) 136, no address conversion is performed either. Thus, the area 434 of the memory space 332 of the PCIe (Ch1) 137 in the memory space 330 of the IC chip 30 is accessed. The access to the area 434 leads to access to the area 444 of the PCIe (Ch0) 146 of the IC chip 40. An address conversion portion 146a (see FIG. 1B) of the PCIe (Ch0) 146 performs input address conversion, whereby an address of the access to the area 444 is converted into an address of the memory space 240 viewed from the CPU 140 in the memory space 340 of the IC chip 40. In the input address conversion by the address conversion portion 146a, for example, processing is based on a set input address conversion setting 404. Thus, the address conversion portion 146a converts an address value associated with data output from the IC chip 10 based on a setting such as the input address conversion setting 404.

Figure 5:
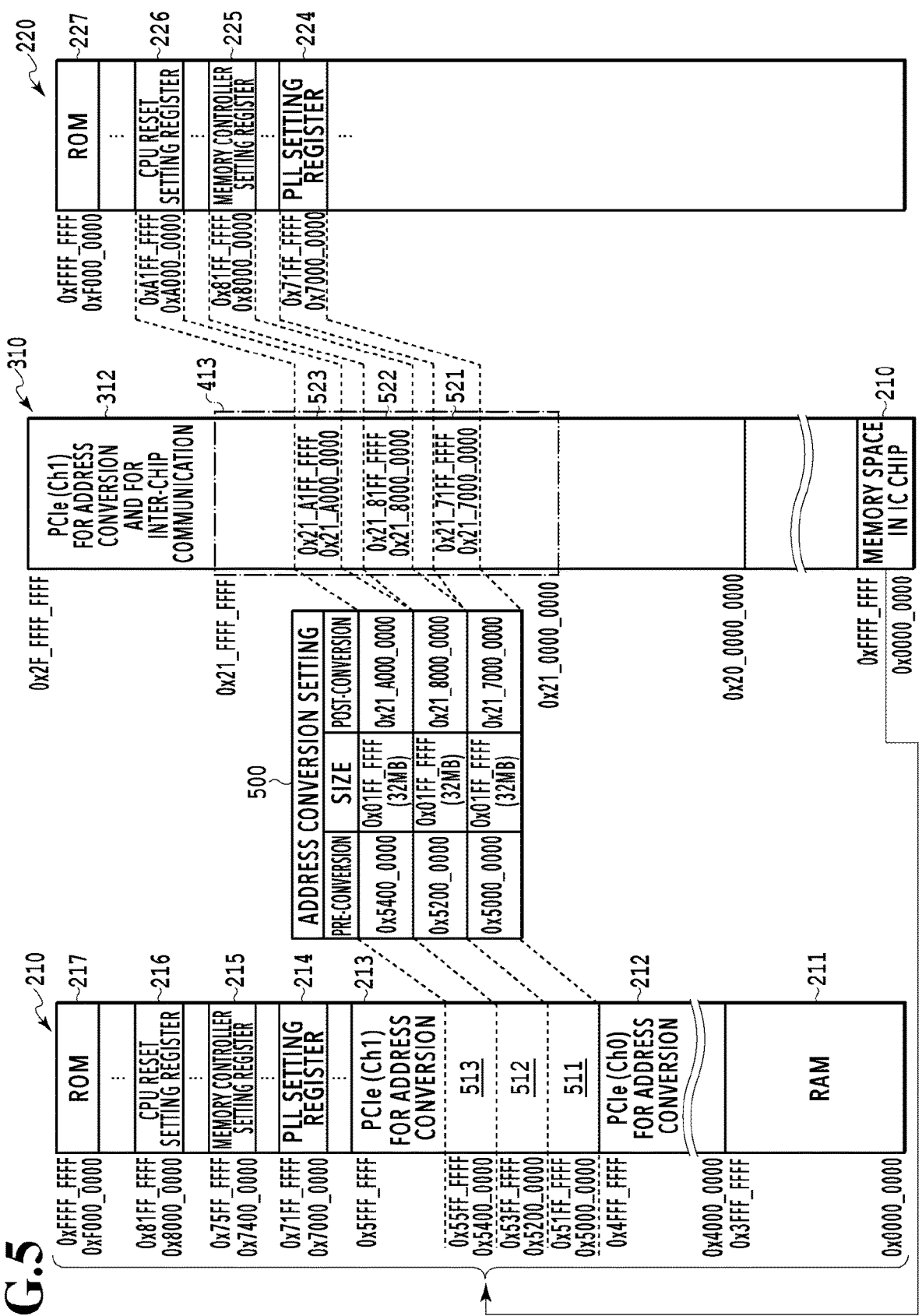
FIG. 5 is a diagram showing a method of accessing an IC chip 20 from a CPU of the IC chip 10.

The processing of accessing the IC chip 20 from the CPU 110 of the IC chip 10 will be described in more detail. FIG. 5 is a diagram showing a method of accessing the IC chip 20 from the CPU 110.

In the case of accessing the IC chip 20 from the CPU 110, the CPU 110 allocates areas 511, 512, and 513 of the slave address space 213 of the PCIe (Ch1) 117 to spaces to access another IC chip (IC chip 20). Here, the CPU 110 sets an address conversion setting 500 for the address conversion portion 117a of the PCIe (Ch1) 117. The address conversion setting 500 is a setting to convert an address of the slave address space 213 into an address of the memory space 312 of the PCIe (Ch1) 117.

In a case where the CPU 110 accesses the area 511, the address conversion portion 117a makes a conversion into an area 521 in the area 412 of the memory space 312 based on the address conversion setting 500. More specifically, in the address conversion setting 500, pre-conversion start address 0x5000_0000, size 0001FF_FFFF (32 MB), and post-conversion start address 0x21_7000_0000 are set. Based on the setting, the access to the area 511 of 32 MB from 0x5000_0000 to 0x51FF_FFFF of the slave address space 213 is converted into the area 521 from 0x21_7000_000 to 0x21_71FF_FFFF of the memory space 312. That is, the address conversion portion 117a can convert an address of access transferred from the CPU 110 into an address of a memory space for communication based on the setting.

After that, as described above with reference to FIG. 4, address conversion is performed such that the CPU 110 can access the memory space 220 of the IC chip 20. At this time, the access from the area 521 is converted into an address of a PLL setting register 224 based on the setting of the address conversion portion 126a. This enables the CPU 110 to access the PLL setting register 224 of the IC chip 20.

In a case where the CPU 110 accesses the area 512, the address conversion portion 117a makes a conversion into an area 522 in the area 412 of the memory space 312 based on the address conversion setting 500. More specifically, in the address conversion setting 500, pre-conversion start address 0x5200_0000, size 0x01FF_FFFF (32 MB), and post-conversion start address 0x21_8000_0000 are set. Based on the setting, the access to the area 512 of 32 MB from 0x5200_0000 to 0x53FF_FFFF of the slave address space 213 is converted into the area 522 from 0x21_8000_0000 to 0x21_81FF_FFFF of the memory space 312.

After that, as described above with reference to FIG. 4, address conversion is performed such that the CPU 110 can access the memory space 220 of the IC chip 20. At this time, the access from the area 522 is converted into an address of a memory controller setting register 225 based on the setting of the address conversion portion 126a. This enables the CPU 110 to access the memory controller setting register 225 of the IC chip 20.

In a case where the CPU 110 accesses the area 513, the address conversion portion 117a makes a conversion into an area 523 in the area 412 of the memory space 312 based on the address conversion setting 500. More specifically, in the address conversion setting 500, pre-conversion start address 0x5400_0000, size 0x01FF_FFFF (32 MB), and post-conversion start address 0x21_A000_0000 are set. Based on the setting, the access to the area 513 of 32 MB from 0x5400_0000 to 0x55FF_FFFF of the slave address space 213 is converted into the area 523 from 0x21_A000_0000 to 0x21_A1FF_FFFF of the memory space 312.

After that, as described above with reference to FIG. 4, address conversion is performed such that the CPU 110 can access the memory space 220 of the IC chip 20. At this time, the access from the area 523 is converted into an address of a CPU reset setting register 226 based on the setting of the address conversion portion 126a. This enables the CPU 110 to access the CPU reset setting register 226 of the IC chip 20.

Figure 6:
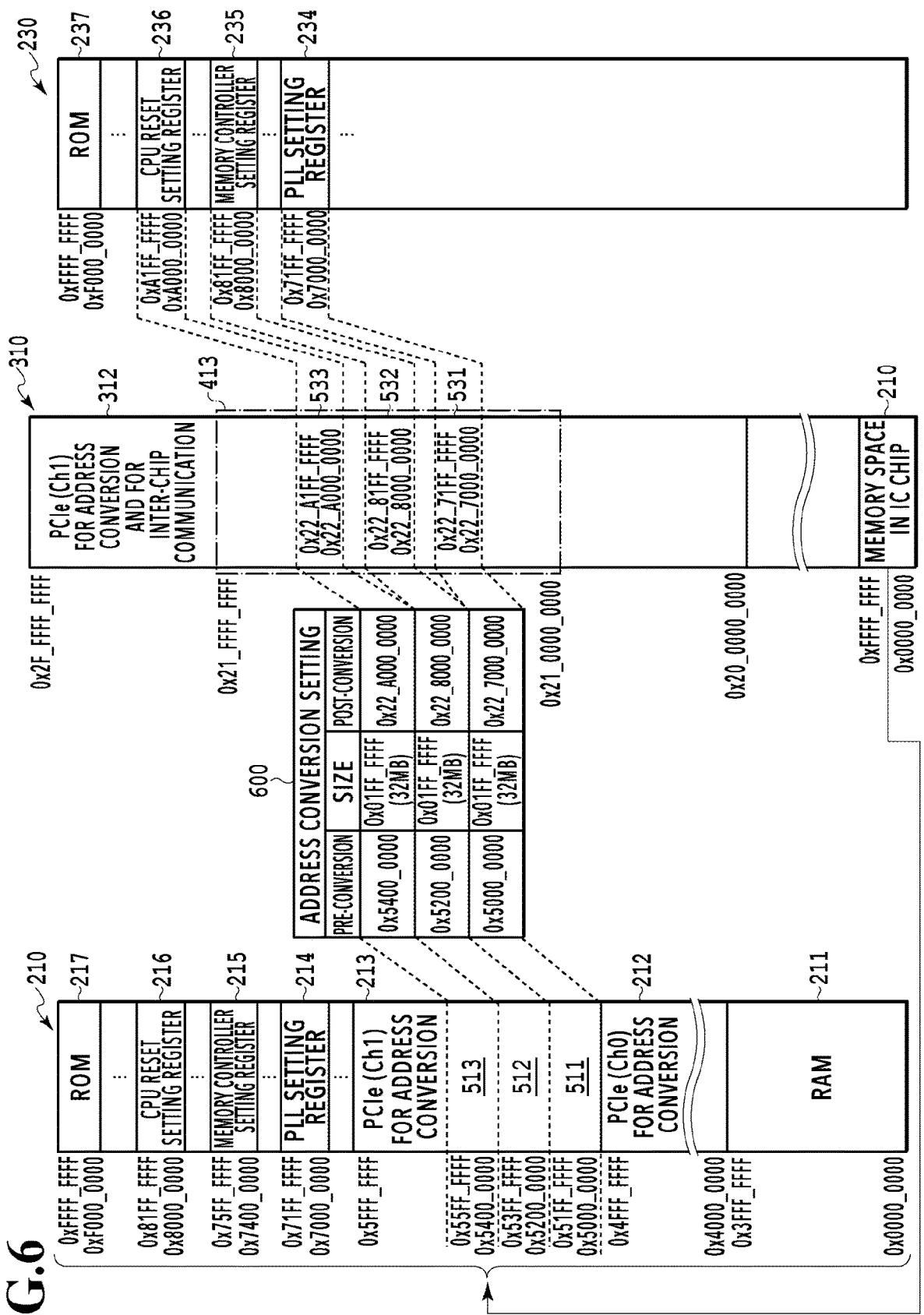
FIG. 6 is a diagram showing a method of accessing an IC chip 30 from the CPU of the IC chip 10.
Figure 8A:
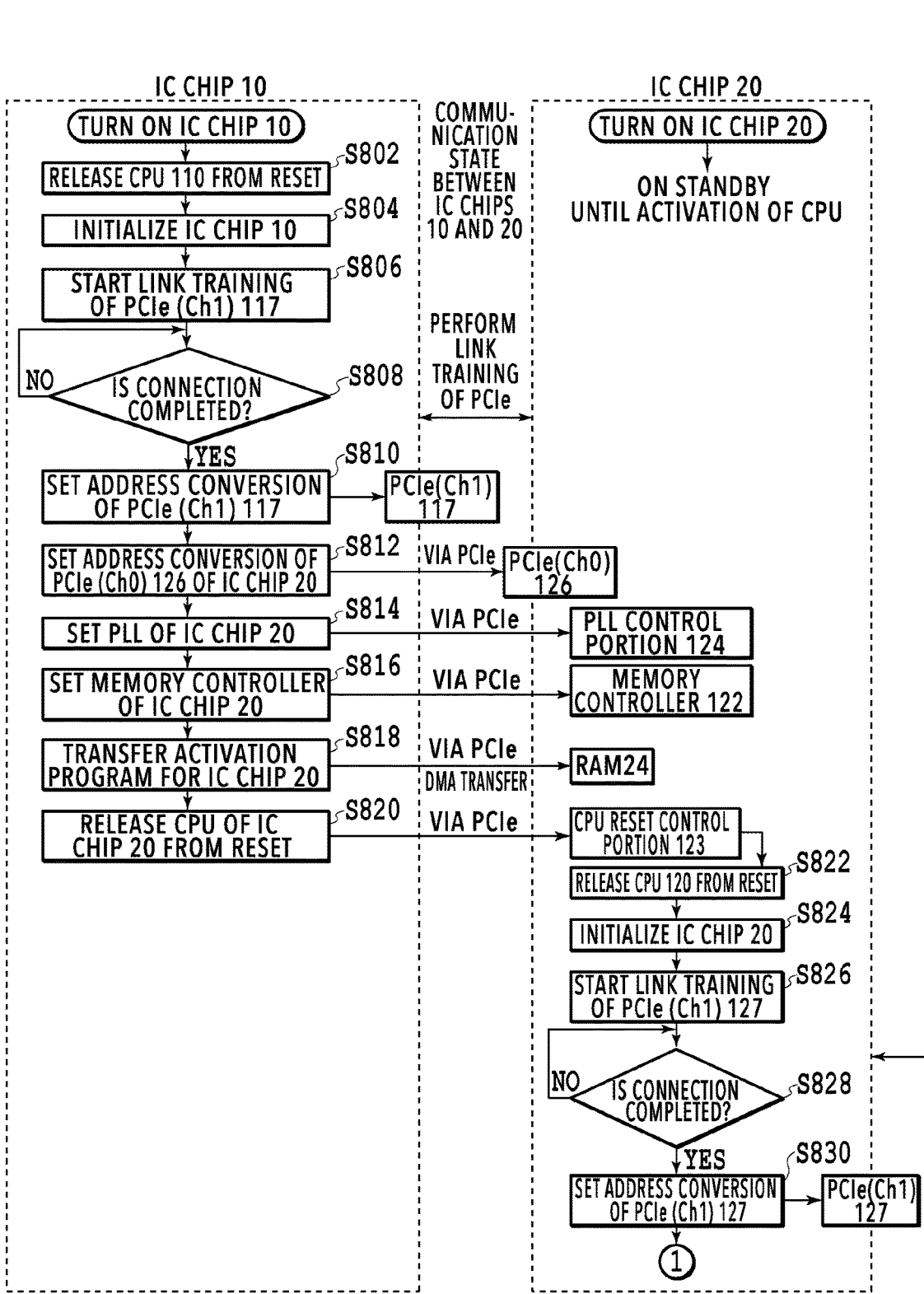
FIGS. 8A and 8B are flowcharts of activation processing in which the IC chip 10 activates the other IC chips.
Figure 8B:
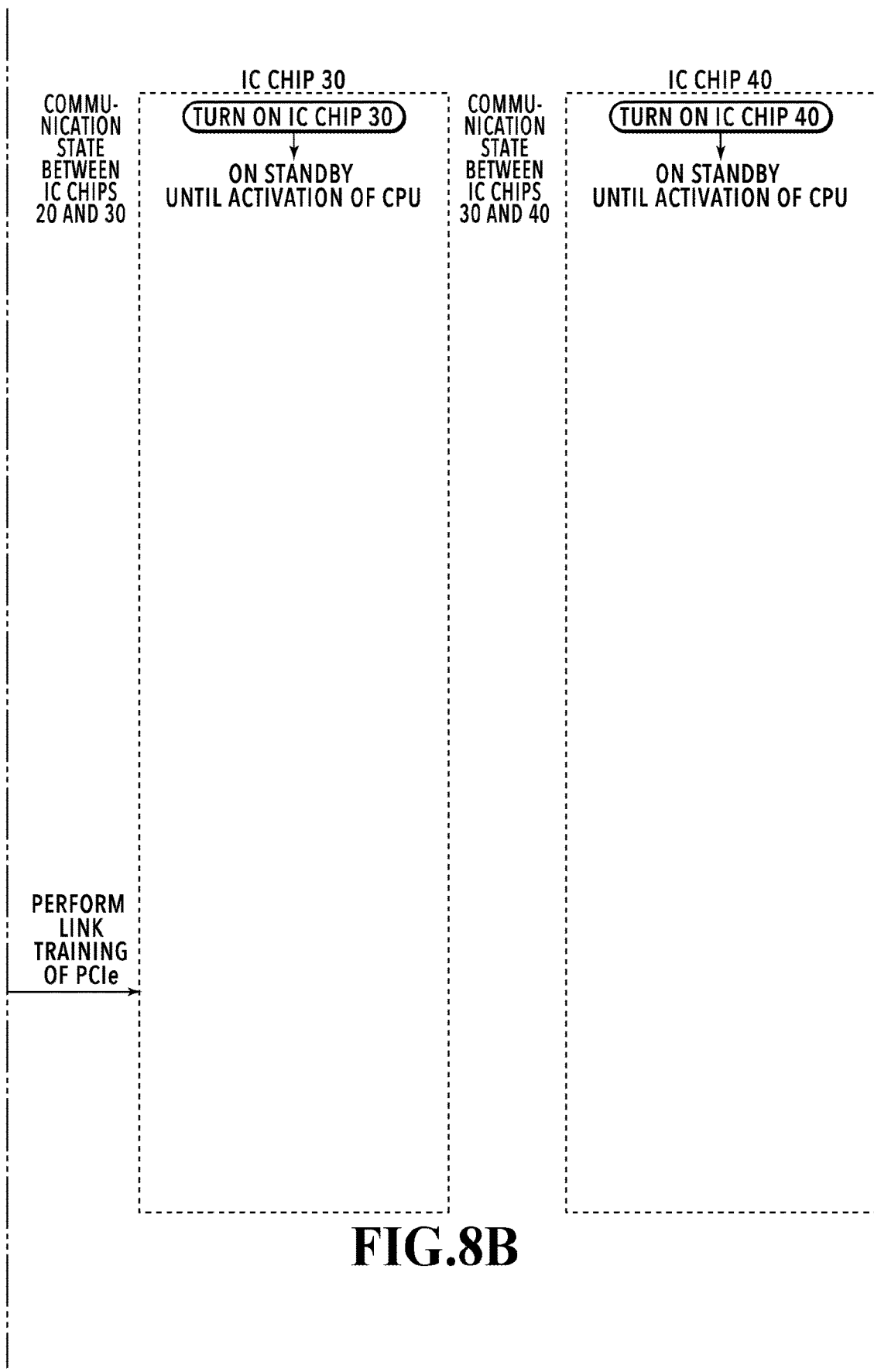
Figure 9A:
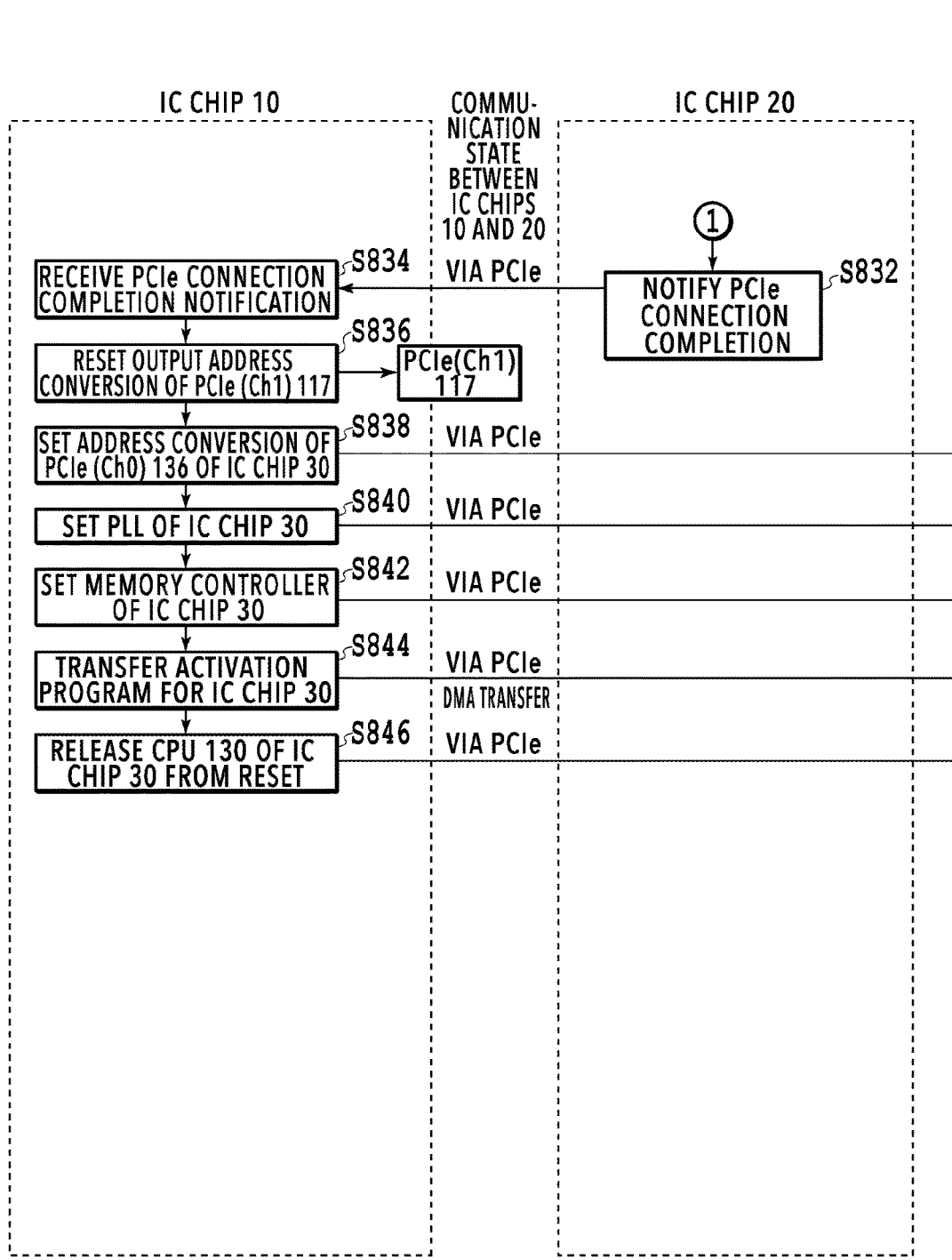
FIGS. 9A and 9B are flowcharts of activation processing subsequent to FIGS. 8A and 8B.
Figure 9B:
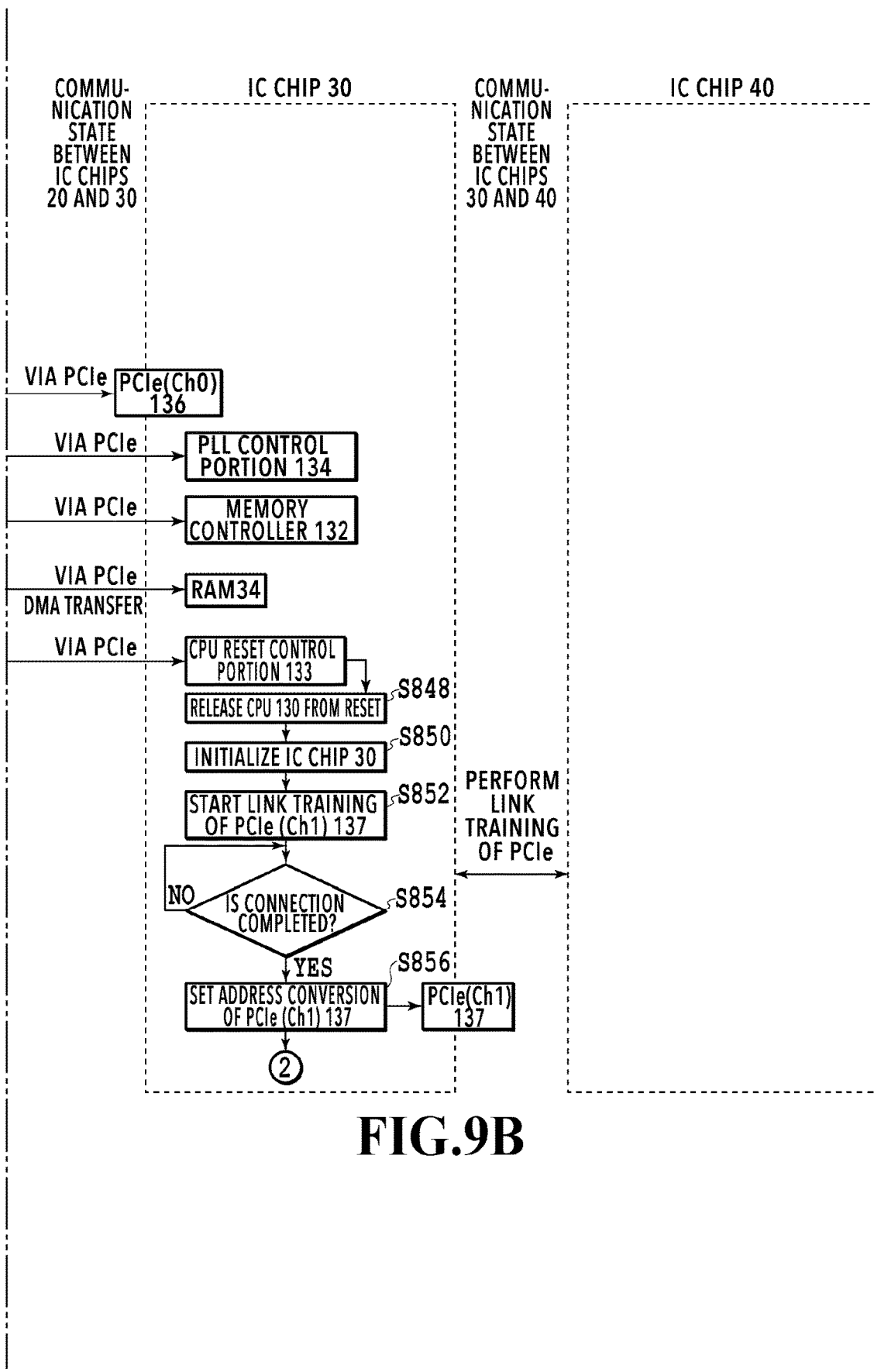
Figure 10A:
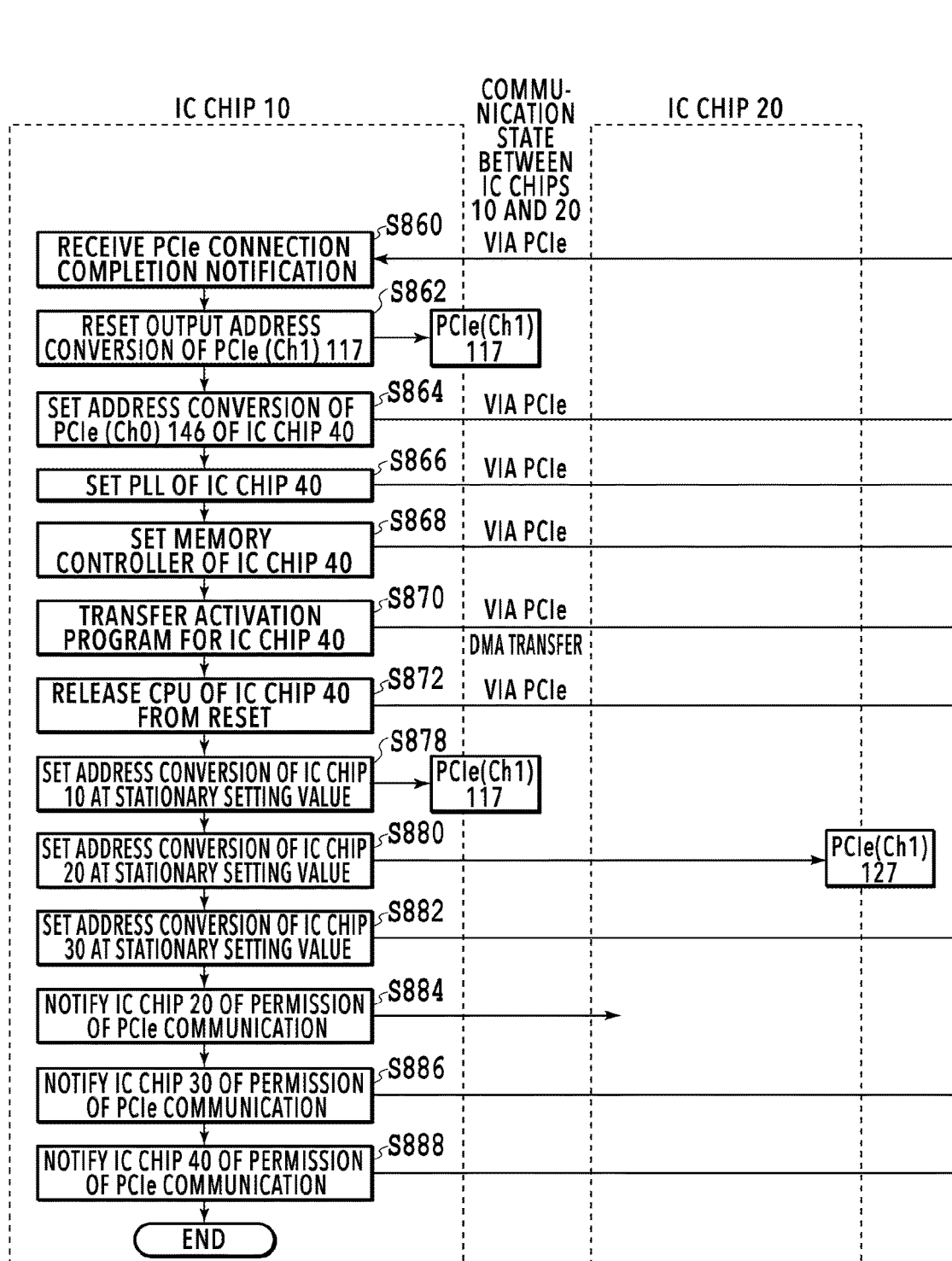
FIGS. 10A and 10B are flowcharts of activation processing subsequent to FIGS. 9A and 9B.
Figure 10B:
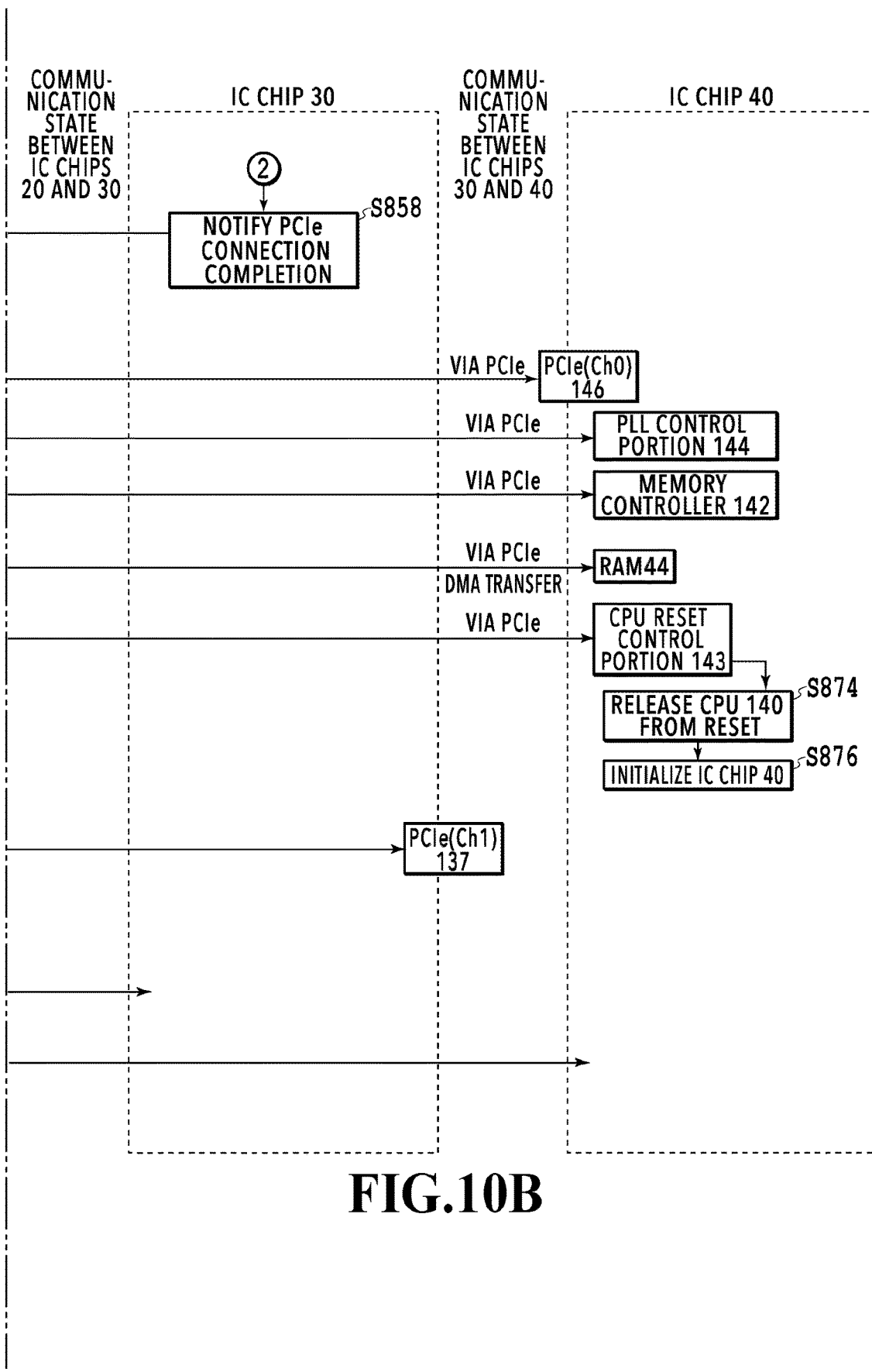
Figure 11A:
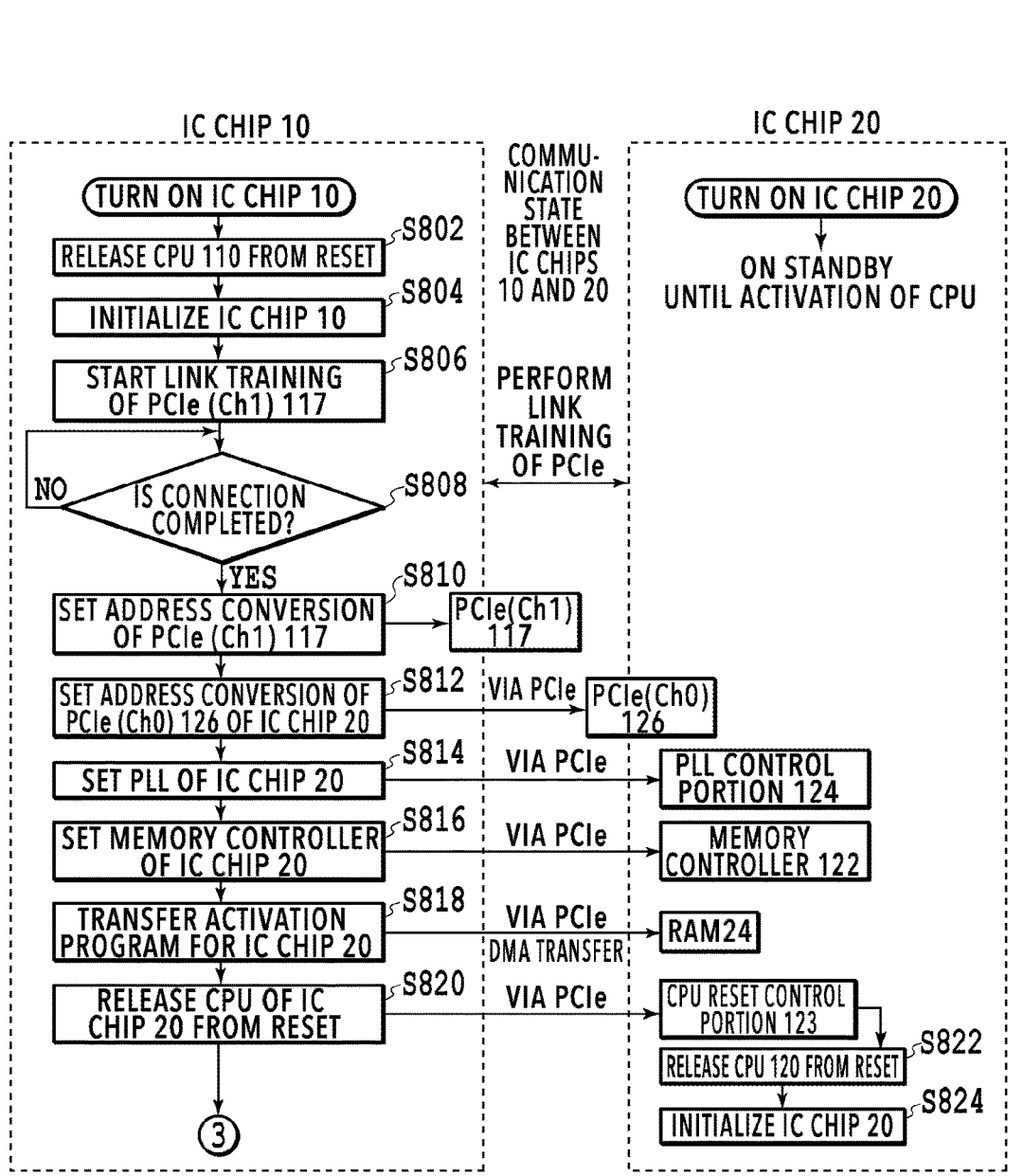
FIGS. 11A and 11B are flowcharts of activation processing in which the IC chip 10 activates the other IC chips.
Figure 11B:
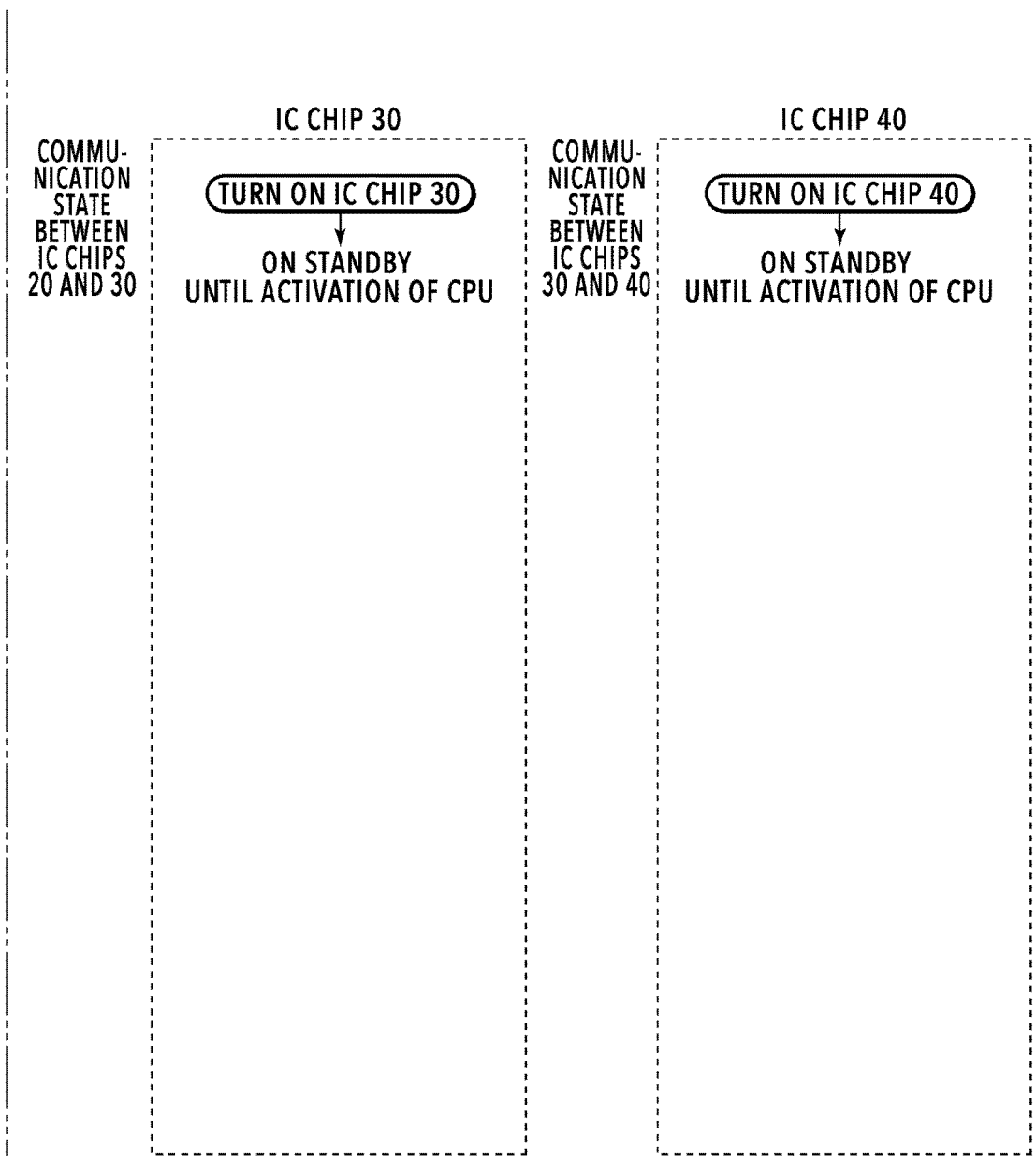
Figure 12A:
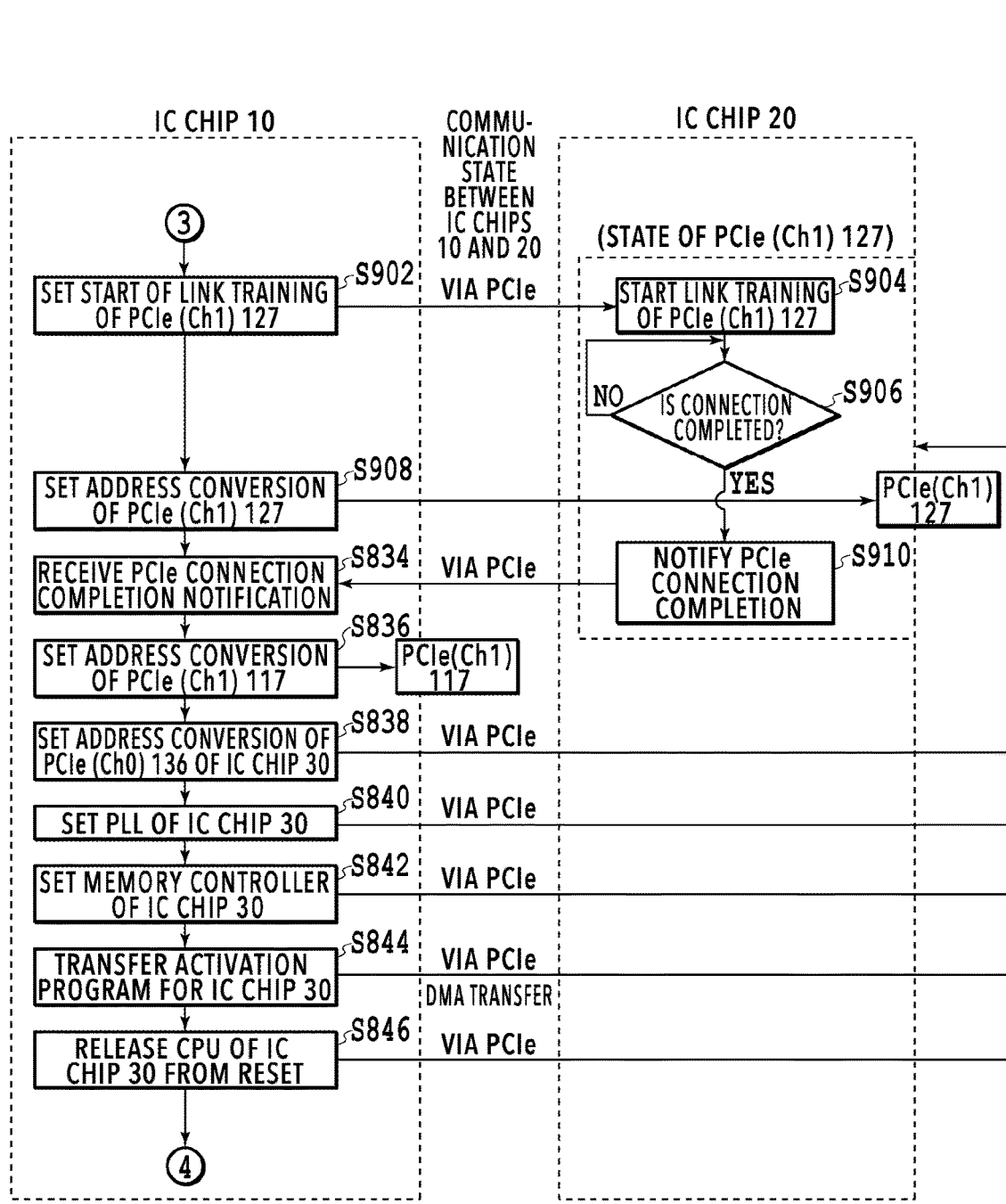
FIGS. 12A and 12B are flowcharts of activation processing subsequent to FIGS. 11A and 11B.
Figure 12B:
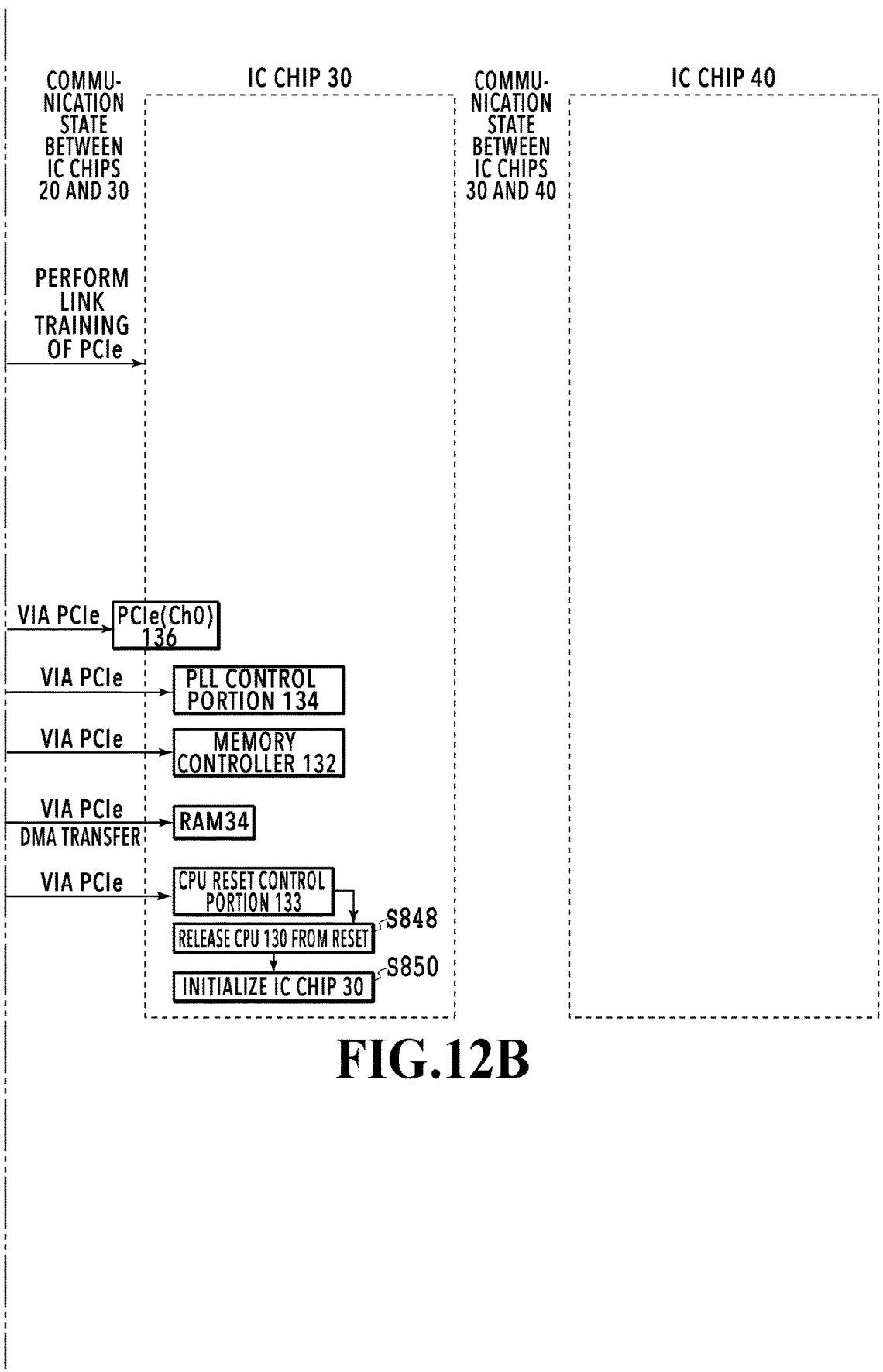
Figure 13A:
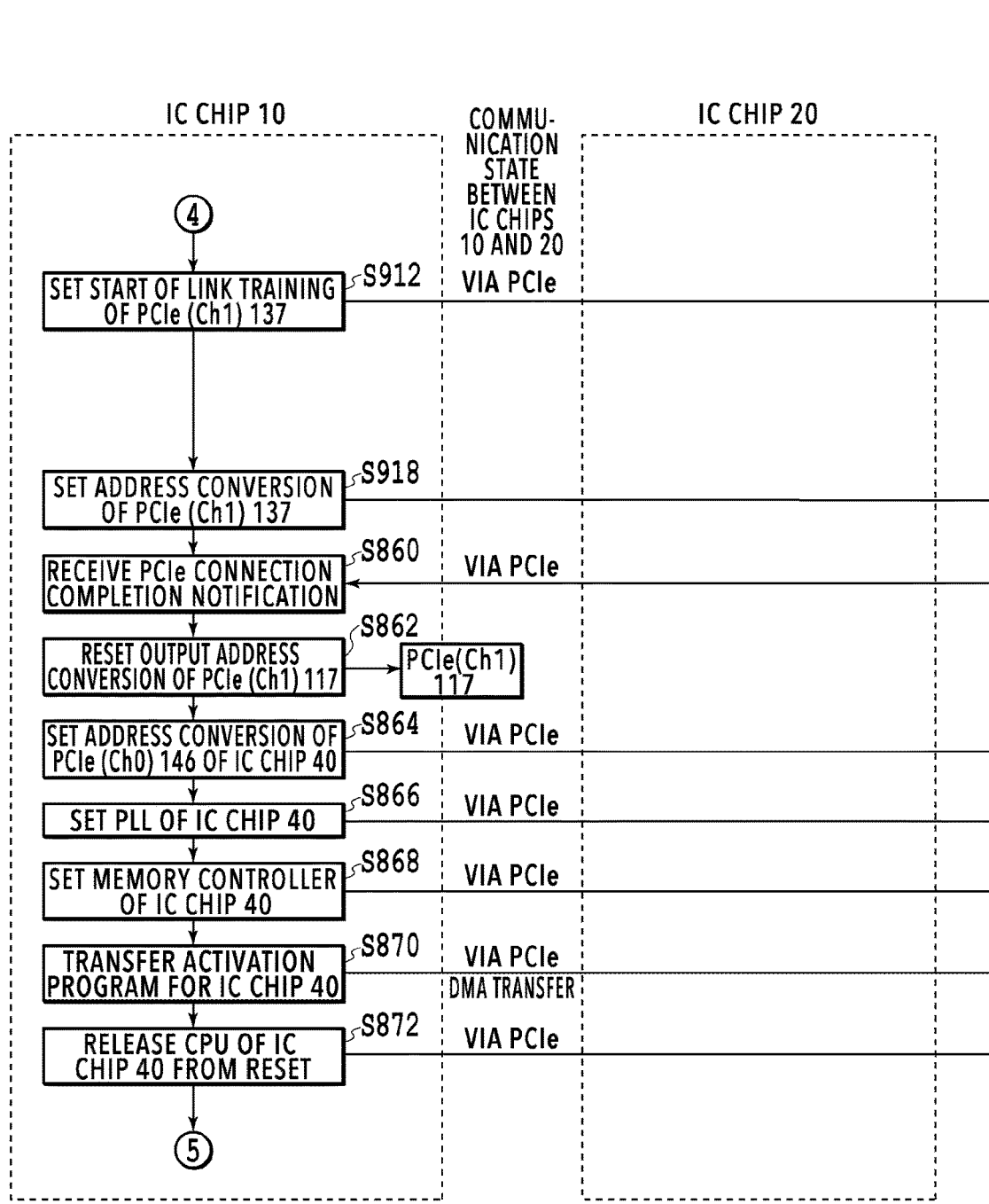
FIGS. 13A and 13B are flowcharts of activation processing subsequent to FIGS. 12A and 12B.
Figure 13B:
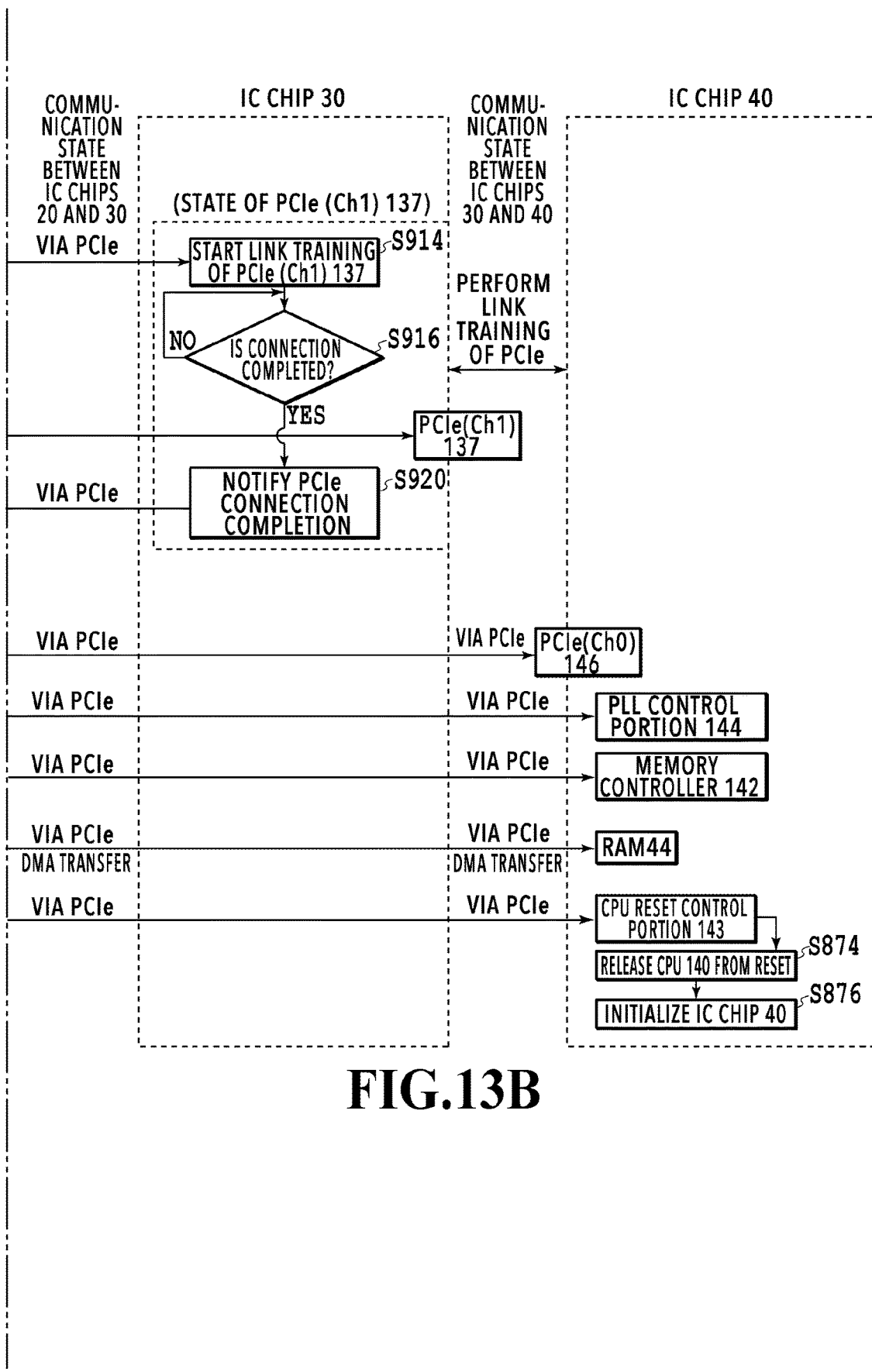
Figure 14A:
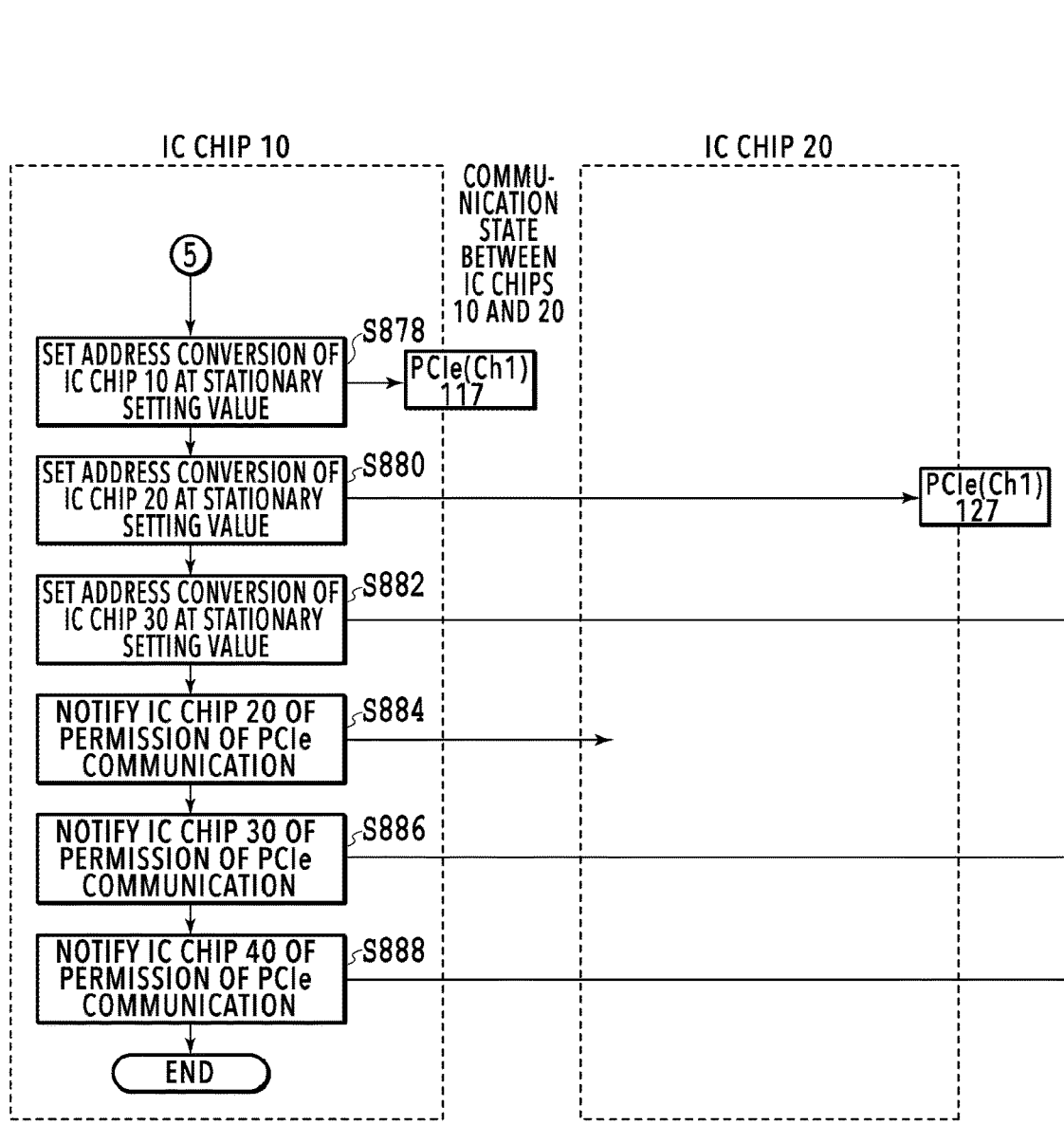
FIGS. 14A and 14B are flowcharts of activation processing subsequent to FIGS. 13A and 13B.
Figure 14B:
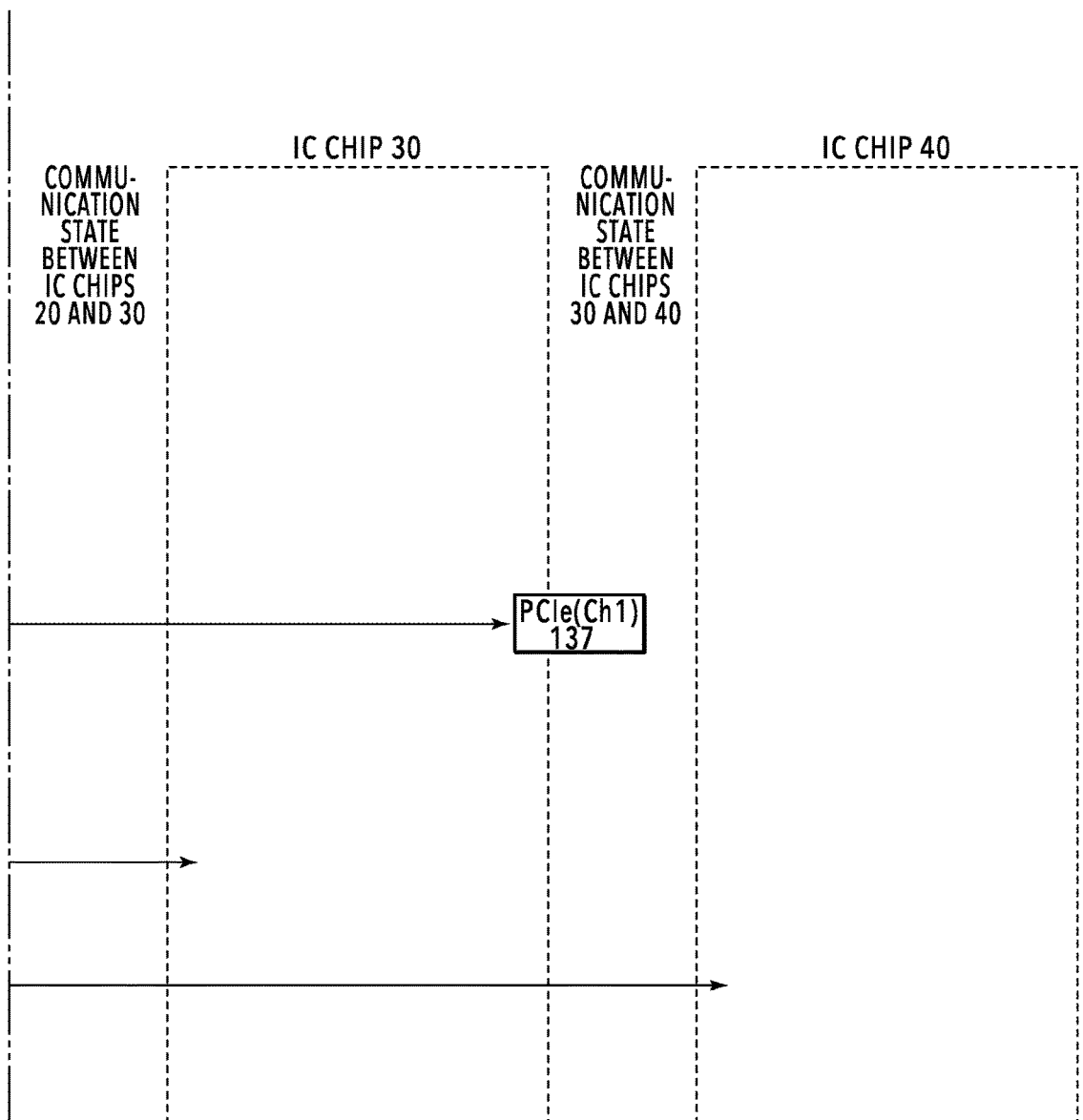

Next, the processing of accessing the IC chip 30 from the CPU 110 will be described in more detail. FIG. 6 is a diagram showing a method of accessing the IC chip 30 from the CPU 110.

In the case of accessing the IC chip 30 from the CPU 110, the CPU 110 reallocates the areas 511, 512, and 513 of the slave address space 213 of the PCIe (Ch1) 117 to spaces to access another IC chip (IC chip 30). Here, the CPU 110 sets an address conversion setting 600 for the address conversion portion 117a of the PCIe (Ch1) 117. The address conversion setting 600 is a setting to convert an address of the slave address space 213 into an address of the memory space 312 of the PCIe (Ch1) 117.

In a case where the CPU 110 accesses the area 511, the address conversion portion 117a makes a conversion into an area 531 in the area 413 of the memory space 312 based on the address conversion setting 600. More specifically, in the address conversion setting 600, pre-conversion start address 0x5000_0000, size 0-01FF_FFFF (32 MB), and post-conversion start address 0x22_7000_0000 are set. Based on the setting, the access to the area 511 of 32 MB from 0-5000_0000 to 0x51FF_FFFF of the slave address space 213 is converted into the area 531 from 0x22_7000_000 to 0-22_71FF_FFFF of the memory space 312.

After that, as described above with reference to FIG. 4, address conversion is performed such that the CPU 110 can access the memory space 230 of the IC chip 30. At this time, the access from the area 531 is converted into an address of a PLL setting register 234 based on the setting of the address conversion portion 136a. This enables the CPU 110 to access the PLL setting register 234 of the IC chip 30.

In a case where the CPU 110 accesses the area 512, the address conversion portion 117a makes a conversion into an area 532 in the area 413 of the memory space 312 based on the address conversion setting 600. More specifically, in the address conversion setting 600, pre-conversion start address 0x5200_0000, size 0x01FF_FFFF (32 MB), and post-conversion start address 0x22_8000_0000 are set. Based on the setting, the access to the area 512 of 32 MB from 0x5200_0000 to 0x53FF_FFFF of the slave address space 213 is converted into the area 532 from 0x22_8000_0000 to 0x22_81FF_FFFF of the memory space 312.

After that, as described above with reference to FIG. 4, address conversion is performed such that the CPU 110 can access the memory space 230 of the IC chip 30. At this time, the access from the area 532 is converted into an address of a memory controller setting register 235 based on the setting of the address conversion portion 136a. This enables the CPU 110 to access the memory controller setting register 235 of the IC chip 30.

In a case where the CPU 110 accesses the area 513, the address conversion portion 117a makes a conversion into an area 533 in the area 413 of the memory space 312 based on the address conversion setting 600. More specifically, in the address conversion setting 600, pre-conversion start address 0x5400_0000, size 0x01FF_FFFF (32 MB), and post-conversion start address 0x22_A000_0000 are set. Based on the setting, the access to the area 513 of 32 MB from 0x5400_0000 to 0x55FF_FFFF of the slave address space 213 is converted into the area 533 from 0x22_A000_0000 to 0x22_A1FF_FFFF of the memory space 312.

After that, as described above with reference to FIG. 4, address conversion is performed such that the CPU 110 can access the memory space 230 of the IC chip 30. At this time, the access from the area 533 is converted into an address of a CPU reset setting register 236 based on the setting of the address conversion portion 136a. This enables the CPU 110 to access the CPU reset setting register 236 of the IC chip 30.

Next, the processing of accessing the IC chip 40 from the CPU 110 will be described in more detail. FIG. 7 is a diagram showing a method of accessing the IC chip 40 from the CPU 110.

In the case of accessing the IC chip 40 from the CPU 110, the CPU 110 reallocates the areas 511, 512, and 513 of the slave address space 213 of the PCIe (Ch1) 117 to spaces to access another IC chip (IC chip 40). Here, the CPU 110 sets an address conversion setting 700 for the address conversion portion 117a of the PCIe (Ch1) 117. The address conversion setting 700 is a setting to convert an address of the slave address space 213 into an address of the memory space 312 of the PCIe (Ch1) 117.

In a case where the CPU 110 accesses the area 511, the address conversion portion 117a makes a conversion into an area 541 in the area 414 of the memory space 312 based on the address conversion setting 700. More specifically, in the address conversion setting 700, pre-conversion start address 0x5000_0000, size 0x01FF_FFFF (32 MB), and post-conversion start address 0x23_7000_0000 are set. Based on the setting, the access to the area 511 of 32 MB from 0x5000_0000 to 0x51FF_FFFF of the slave address space 213 is converted into the area 541 from 0x23_7000_000 to 0x23_71FF_FFFF of the memory space 312.

After that, as described above with reference to FIG. 4, address conversion is performed such that the CPU 110 can access the memory space 240 of the IC chip 40. At this time, the access from the area 541 is converted into an address of a PLL setting register 244 based on the setting of the address conversion portion 146a. This enables the CPU 110 to access the PLL setting register 244 of the IC chip 40.

In a case where the CPU 110 accesses the area 512, the address conversion portion 117a makes a conversion into an area 542 in the area 414 of the memory space 312 based on the address conversion setting 700. More specifically, in the address conversion setting 700, pre-conversion start address 0x5200_0000, size 0x01FF_FFFF (32 MB), and post-conversion start address 0x23_8000_0000 are set. Based on the setting, the access to the area 512 of 32 MB from 0x5200_0000 to 0x53FF_FFFF of the slave address space 213 is converted into the area 542 from 0x23_8000_0000 to 0x23_81FF_FFFF of the memory space 312.

After that, as described above with reference to FIG. 4, address conversion is performed such that the CPU 110 can access the memory space 240 of the IC chip 40. At this time, the access from the area 542 is converted into an address of a memory controller setting register 245 based on the setting of the address conversion portion 146a. This enables the CPU 110 to access the memory controller setting register 245 of the IC chip 40.

In a case where the CPU 110 accesses the area 513, the address conversion portion 117a makes a conversion into an area 543 in the area 414 of the memory space 312 based on the address conversion setting 700. More specifically, in the address conversion setting 700, pre-conversion start address 0x5400_0000, size 0x01FF_FFFF (32 MB), and post-conversion start address 0x23_A000_0000 are set. Based on the setting, the access to the area 513 of 32 MB from 0x5400_0000 to 0x55FF_FFFF of the slave address space 213 is converted into the area 543 from 0x23_A000_0000 to 0x23_A1FF_FFFF of the memory space 312.

After that, as described above with reference to FIG. 4, address conversion is performed such that the CPU 110 can access the memory space 240 of the IC chip 40. At this time, the access from the area 543 is converted into an address of a CPU reset setting register 246 based on the setting of the address conversion portion 146*a*. This enables the CPU 110 to access the CPU reset setting register 246 of the IC chip 40.

Activation of IC Chip

A description will be given of processing of activation of the other IC chips by the IC chip 10 using the above accessing method. FIG. 8A to FIG. 10B are flowcharts showing the detailed contents of activation processing of the IC chips 20, 30, and 40 by the IC chip 10. In the description of the processing, sign "S" indicates a step in the flowcharts (the same applies hereinafter).

If the power is turned on, in the IC chip 10, the CPU reset control portion 113 receives control from the reset IC 50, the CPU 110 is released from reset (S802), and the CPU 110 is activated. Next, the CPU 110 reads an activation program for the IC chip 10 from the ROM 12 and initializes the IC chip 10 (S804). After that, the CPU 110 starts link training of the PCIe (Ch1) 117 (S806) and determines whether the link training is finished, that is, connection is completed (S808).

If it is determined in S808 that the link training is finished, the CPU 110 makes an address conversion setting of the PCIe (Ch1) 117 (S810). In S810, the address conversion setting 500 is set for the address conversion portion 117*a*. As a result, as described above with reference to FIG. 5, an address of the memory space 210 viewed from the CPU 110 can be converted into an address of the memory space 310 of the IC chip 10. More specifically, addresses of the areas 511, 512, and 513 of the slave address space 213 can be converted into addresses of the areas 521, 522, and 523 in the area 412 of the slave address space 312, respectively. That is, the CPU 110 sets the address conversion portion 117*a* so as to enable access to a register of the memory space of the IC chip 20 necessary for activation.

The CPU 110 also makes an address conversion setting of the PCIe (Ch0) 126 via the PCIe (Ch1) 117 (S812). That is, in S812, the address conversion portion 126*a* is set such that addresses of access from the areas 521, 522, and 523 are converted into addresses of the PLL setting register 224, memory controller setting register 225, and CPU reset setting register 226, respectively. As a result, as described above with reference to FIGS. 4 and 5, the PLL setting register 224, memory controller setting register 225, and CPU reset setting register 226 of the IC chip 20 can be accessed from the CPU 110.

Next, as described above with reference to FIG. 5, the CPU 110 accesses the area 511, thereby accesses the PLL setting register 224 of the IC chip 20, and makes a setting of the PLL control portion 124 (see FIG. 1A) (S814). As described above with reference to FIG. 5, the CPU 110 also accesses the area 512, thereby accesses the memory controller setting register 225 of the IC chip 20, and makes a setting of the memory controller 122 (see FIG. 1A) (S816). The CPU 110 also transfers an activation program for the IC chip 20 to the RAM 24 connected to the IC chip 20 via the PCIe (S818). Since the transfer of the activation program requires a large number of data, it is preferable to use a DMAC. Further, as described above with reference to FIG. 5, the CPU 110 accesses the area 513, thereby accesses the CPU reset setting register 226 of the IC chip 20, and makes a setting of the CPU reset control portion 123 (see FIG. 1A) (S820). This releases the CPU 120 from reset (S822) and activates the CPU 120. That is, the CPU 110 uses the PCIe 117 and the PCIe 126 to load the activation program for the IC chip 20 from the ROM 12 connected to the IC chip 10 into the RAM 24 connected to the IC chip 20. After that, the CPU 110 accesses the CPU reset setting register 226 and activates the CPU 120.

If the CPU 120 of the IC chip 20 is released from reset, the CPU 120 reads a program from the RAM 24 and initializes the IC chip 20 (S824). The program read from the RAM 24 by the CPU 120 is the activation program transferred in S818. Next, the CPU 120 starts link training of the PCIe (Ch1) 127 (S826) and determines whether the link training is finished (S828).

If it is determined in S826 that the link training is finished, the CPU 120 makes an address conversion setting of the PCIe (Ch1) 127 (S830). S826 and S828 may be concurrently executed. After that, the CPU 120 notifies the IC chip 10 that the connection of the PCIe (Ch1) 127 is completed, that is, the link training is finished (S832). At this time, although the initialization of the IC chip 20 has been completed, PCIe communication will not be performed until a notification of PCIe communication permission is received from the IC chip 10 (this will be described later).

If the CPU 110 receives the notification that the link training of the PCIe (Ch1) 127 is finished (S834), the CPU 110 makes an address conversion setting of the PCIe (Ch1) 117 (S836). In S836, the address conversion setting 600 is set for the address conversion portion 117*a*. As a result, as described above with reference to FIG. 6, an address of the memory space 210 viewed from the CPU 110 can be converted into an address of the memory space 310 of the IC chip 10. More specifically, addresses of the areas 511, 512, and 513 of the slave address space 213 can be converted into addresses of the areas 531, 532, and 533 in the area 413 of the slave address space 312, respectively.

The CPU 110 also makes an address conversion setting of the PCIe (Ch0) 136 via the PCIe (Ch1) 127 (S838). That is, in S838, the address conversion portion 136*a* is set such that addresses of access from the areas 531, 532, and 533 are converted into addresses of the PLL setting register 234, memory controller setting register 235, and CPU reset setting register 236, respectively. As a result, as described above with reference to FIGS. 4 and 6, the PLL setting register 234, memory controller setting register 235, and CPU reset setting register 236 of the IC chip 30 can be accessed from the CPU 110. Incidentally, the setting of the address conversion portion 126*a* so as not to convert the addresses of the areas 531, 532, and 533 may be made in either S838 or S812. Further, although the CPU 110 makes the address conversion setting of the address conversion portion 136*a* in the present embodiment, the CPU 110 may make the address conversion setting of the address conversion portion 127*a* instead of the address conversion portion 136*a*. That is, the CPU 110 only has to make the address conversion setting of either one of the address conversion portions 136*a* and 127*a*.

Next, as described above with reference to FIG. 6, the CPU 110 accesses the area 511, thereby accesses the PLL setting register 234 of the IC chip 30, and makes a setting of the PLL control portion 134 (see FIG. 1B) (S840). As described above with reference to FIG. 6, the CPU 110 also accesses the area 512, thereby accesses the memory controller setting register 235 of the IC chip 30, and makes a setting of the memory controller 132 (see FIG. 1B) (S842).

The CPU 110 also transfers an activation program for the IC chip 30 to the RAM 34 connected to the IC chip 30 via the PCIe (S844). As described above, it is preferable to use a DMAC to transfer the activation program. As described above with reference to FIG. 6, the CPU 110 also accesses the area 513, thereby accesses the CPU reset setting register 236 of the IC chip 30, and makes a setting of the CPU reset control portion 133 (see FIG. 1B) (S846). This releases the CPU 130 from reset (S848) and activates the CPU 130. That is, the CPU 110 uses the PCIe 117, PCIe 126, and PCIe 127 to load the activation program for the IC chip 30 from the ROM 12 connected to the IC chip 10 into the RAM 34 connected to the IC chip 30. After that, the CPU 110 accesses the CPU reset setting register 236 and activates the CPU 130.

If the CPU 130 of the IC chip 30 is released from reset, the CPU 130 reads a program from the RAM 34 and initializes the IC chip 30 (S850). The program read from the RAM 34 by the CPU 130 is the activation program transferred in S844. Next, the CPU 130 starts link training of the PCIe (Ch1) 137 (S852) and determines whether the link training is finished (S854).

If it is determined in S854 that the link training is finished, the CPU 130 makes an address conversion setting of the PCIe (Ch1) 137 (S856). S854 and S856 may be concurrently executed. After that, the CPU 130 notifies the IC chip 10 that the link training of the PCIe (Ch1) 137 is finished (S858). At this time, although the initialization of the IC chip 30 has been completed, PCIe communication will not be performed until a notification of PCIe communication permission is received from the IC chip 10 (this will be described later).

If the CPU 110 receives the notification that the link training of the PCIe (Ch1) 137 is finished (S860), the CPU 110 makes an address conversion setting of the PCIe (Ch1) 117 (S862). In S862, the address conversion setting 700 is set for the address conversion portion 117a. As a result, as described above with reference to FIG. 7, an address of the memory space 210 viewed from the CPU 110 can be converted into an address of the memory space 310 of the IC chip 10. More specifically, addresses of the areas 511, 512, and 513 of the slave address space 213 can be converted into addresses of the areas 541, 542, and 543 in the area 414 of the slave address space 312, respectively.

The CPU 110 also makes an address conversion setting of the PCIe (Ch0) 146 via the PCIe (Ch1) 137 (S864). That is, in S864, the address conversion portion 146a is set such that addresses of access from the areas 541, 542, and 543 are converted into addresses of the PLL setting register 244, memory controller setting register 245, and CPU reset setting register 246, respectively. As a result, as described above with reference to FIGS. 4 and 7, the PLL setting register 244, memory controller setting register 245, and CPU reset setting register 246 of the IC chip 30 can be accessed from the CPU 110. Incidentally, the setting of the address conversion portion 126a so as not to convert the addresses of the areas 541, 542, and 543 may be made in either S864 or S812. The setting of the address conversion portion 136a so as not to convert the addresses of the areas 541, 542, and 543 may be executed in either S864 or S838.

Next, as described above with reference to FIG. 7, the CPU 110 accesses the area 511, thereby accesses the PLL setting register 244 of the IC chip 40, and makes a setting of the PLL control portion 144 (see FIG. 1B) (S866). As described above with reference to FIG. 7, the CPU 110 also accesses the area 512, thereby accesses the memory controller setting register 245 of the IC chip 40, and makes a setting of the memory controller 142 (see FIG. 1B) (S868).

The CPU 110 also transfers an activation program for the IC chip 40 to the RAM 44 connected to the IC chip 40 via the PCIe (S870). As described above, it is preferable to use a DMAC to transfer the activation program. As described above with reference to FIG. 7, the CPU 110 also accesses the area 513, thereby accesses the CPU reset setting register 246 of the IC chip 40, and makes a setting of the CPU reset control portion 143 (see FIG. 1B) (S872). This releases the CPU 140 from reset (S874) and activates the CPU 140.

If the CPU 140 of the IC chip 40 is released from reset, the CPU 140 reads a program from the RAM 44 and initializes the IC chip 40 (S876). The program read from the RAM 44 by the CPU 140 is the activation program transferred in S870. At this time, although the initialization of the IC chip 40 has been completed, PCIe communication will not be performed until a notification of PCIe communication permission is received from the IC chip 10 (this will be described later).

Further, if the CPU 140 is released from reset, the CPU 110 sets the address conversion of the PCIe (Ch1) 117 of the IC chip 10 at a setting value in a standby status (S878). The CPU 110 also sets the address conversion of the PCIe (Ch1) 127 of the IC chip 20 at a setting value in a standby status (S880). The CPU 110 also sets the address conversion of the PCIe (Ch1) 137 of the IC chip 30 at a setting value in a standby status (S882). A setting value in a standby status indicates a setting value for a register necessary for print control of the printing apparatus 1000 differently from the PLL setting register, memory controller setting register, and CPU reset setting register accessed at the time of activation, Ire other words, after the activation processing of the CPU 120 and CPU 130, the CPU 110 changes the settings of the address conversion portion 117a and address conversion portion 126a such that each IC chip is capable of communication.

After that, the CPU 110 notifies the IC chip 20 of the permission of PCIe communication (S884) and PCIe communication is started in the IC chip 20. The CPU 110 also notifies the IC chip 30 of the permission of PCIe communication (S886) and PCIe communication is started in the IC chip 30. The CPU 110 also notifies the IC chip 40 of the permission of PCIe communication (S888), PCIe communication is started in the IC chip 40, and the activation processing is finished.

Second Embodiment

Next, an information processing apparatus according to a second embodiment will be described with reference to FIG. 11A to FIG. 14B. A detailed description of a constituent element identical or corresponding to that of the first embodiment described above will be omitted by using the same reference numeral as that used in the first embodiment.

The second embodiment is different from the first embodiment described above in that the connection processing of the PCIe (Ch1) 127 of the IC chip 20 and the PCIe (Ch1) 137 of the IC chip 30 is managed by the CPU 110.

Activation of IC Chip

Activation processing in the information processing apparatus according to the second embodiment will be described with reference to FIG. 11A to FIG. 14B. FIG. 11A to FIG. 14B are flowcharts showing the detailed contents of the activation processing of the IC chips 20, 30, and 40 by the IC chip 10. A description of a step having the same content as that of the activation processing in the first embodiment will be omitted as appropriate by using the same step number.

After the power is turned on and the CPU 110 is released from reset in S802, if the processing advances and the IC chip 20 is initialized in S824, the CPU 110 issues an instruction to start link training of the PCIe (Ch1) 127 (S902). The PCIe (Ch1) 127 then starts link training (S904) and it is determined whether the link training in the PCIe (Ch1) 127 is finished (S906). The CPU 110 also makes an address conversion setting of the PCIe (Ch1) 127 (S908). S906 and S908 may be concurrently executed. If it is determined in S906 that the link training in the PCIe (Ch1) 127 is finished, the IC chip 10 is notified that the link training is finished (S910). As the method of notification in S910, it is possible to use various well-known techniques such as an interrupt notification mechanism and a method of monitoring by polling from the IC chip 10.

After the CPU 110 receives in S834 the notification that the link training of the PCIe (Ch1) 127 is finished, the process advances and the IC chip 30 is initialized in S850. After that, the CPU 110 issues an instruction to start link training of the PCIe (Ch1) 137 (S912) and the PCIe (Ch1) 137 starts link training (S914). It is determined whether the link training is finished in the PCIe (Ch1) 137 (S916). Further, the CPU 110 makes an address conversion setting of the PCIe (Ch1) 137 (S918). S916 and S918 may be concurrently executed. After that, if it is determined in S916 that the link training in the PCIe (Ch1) 137 is finished, the IC chip 10 is notified that the link training is finished (S920). As the method of notification in S920, various well-known techniques can be used like the method of notification in S910.

After that, the CPU 110 receives in S860 the notification that the link training of the PCIe (Ch1) 137 is finished and then S862 and subsequent steps are executed.

As explained above, in the information processing apparatus 100 according to the above embodiment, an area of the memory space 213 for address conversion of the IC chip 10 is allocated to access to a target IC chip to be activated. Further, setting information for converting an address of the allocated area into an address of the memory space 312 for communication is set for the address conversion portion 117a of the IC chip 10 at the time of activation of the target IC chip. Based on the setting information and the setting of the address conversion portion (126a, 136a, 146a) of the target IC chip, a register in the IC chip relating to activation is accessed and a configuration setting is made to activate the IC chip.

Therefore, in the information processing apparatus 100 according to the above embodiment, the IC chip 10 can reliably activate the other IC chips using limited address conversion resources even if the platform block and the user-developed block are distant from each other in the memory space.

Other Embodiments

The above embodiments may be modified as stated in (1) to (3) below.

(1) In the above embodiments, the inkjet printing apparatus 1000 provided with the information processing apparatus 100 is described as example. However, the information processing apparatus 100 may be provided in an apparatus which performs data transfer such as a general personal computer or server.

(2) In the above embodiments, the IC chips 20, 30, and 40 have the same configuration. However, the configuration is not limited to this and IC chips may have different configurations. Alternatively, the IC chip 10 may be different in configuration from the IC chips 20, 30, and 40. In addition, although two IC chips are connected by PCI Express, the interface is not limited to this. Any interface may be used as long as IC chips are in peer-to-peer connection with each other.

(3) The above embodiments and various modifications stated in (1) and (2) may be combined as appropriate.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-020364, filed Feb. 12, 2021, which is hereby incorporated by reference wherein in its entirety.

What is claimed is:

1. An information processing apparatus comprising:
a first storage unit storing an activation program;
a first IC chip connected to the first storage unit;
a second IC chip connected to the first IC chip; and
a third IC chip connected to the second IC chip,
wherein the first IC chip comprises:
   a first control unit configured to control the first IC chip;
   a first communication unit configured to communicate with the second IC chip; and
   a first address conversion unit configured to convert an address of access transferred from the first control unit into an address of a memory space for communication based on a setting,
wherein the second IC chip comprises:
   a second control unit configured to control the second IC chip;
   a second communication unit configured to communicate with the first IC chip;
   a third communication unit configured to communicate with the third IC chip; and
   a second address conversion unit configured to convert an address of access transferred from the first control unit into an address of a memory space for communication based on a setting,
wherein the third IC chip comprises:
   a third control unit configured to control the third IC chip; and
   a fourth communication unit configured to communicate with the second IC chip,
wherein the first control unit makes a setting of the first address conversion unit so as to enable access to a first register in a memory space of the second IC chip necessary for activation,
wherein the first control unit uses the first communication unit and the second communication unit to load an activation program for the second IC chip from the first storage unit into a second storage unit connected to the second IC chip, then accesses the first register, and activate the second control unit,
wherein the first control unit further changes a setting of the first address conversion unit and the second address conversion unit so as to enable access to a second register in a memory space of the third IC chip necessary for activation,
wherein the first control unit uses the first, second, third, and fourth communication units to load an activation program for the third IC chip from the first storage unit connected to the first IC chip into a third storage unit connected to the third IC chip, then accesses the second register, and activate the third control unit, and wherein, after performing activation processing of the second and third control units, the first control unit changes a setting of the first address conversion unit and the second address conversion unit such that each IC chip is capable of communication.

2. The information processing apparatus according to claim 1, wherein, after performing activation processing of the second and third control units, the first control unit notifies the second and third IC chips of communication permission and causes each IC chip to start communication.

3. The information processing apparatus according to claim 1, wherein the first register includes a register configured to release the second control unit from reset.

4. The information processing apparatus according to claim 1, wherein the first register includes a register configured to control a PLL control portion.

5. The information processing apparatus according to claim 1, wherein the first register includes a register configured to control a memory control portion for the second storage unit, and wherein, after accessing the memory control portion, the first control unit transfers an activation program for activating the second IC chip to the second storage unit.

6. The information processing apparatus according to claim 1, wherein print data generated using the first, second, and third IC chips is transmitted to a print head.

7. A control method executed in an information processing apparatus, the information processing apparatus comprising:
a first storage unit storing an activation program;
a first IC chip connected to the first storage unit;
a second IC chip connected to the first IC chip; and
a third IC chip connected to the second IC chip,
wherein the first IC chip comprises:
a first control unit configured to control the first IC chip;
a first communication unit configured to communicate with the second IC chip; and
a first address conversion unit configured to convert an address of access transferred from the first control unit into an address of a memory space for communication based on a setting,
wherein the second IC chip comprises:
a second control unit configured to control the second IC chip;
a second communication unit configured to communicate with the first IC chip;
a third communication unit configured to communicate with the third IC chip; and
a second address conversion unit configured to convert an address of access transferred from the first control unit into an address of a memory space for communication based on a setting,
wherein the third IC chip comprises:
a third control unit configured to control the third IC chip; and
a fourth communication unit configured to communicate with the second IC chip,
the control method comprising:
by the first control unit, making a setting of the first address conversion unit so as to enable access to a first register in a memory space of the second IC chip necessary for activation;
by the first control unit, using the first communication unit and the second communication unit to load an activation program for the second IC chip from the first storage unit into a second storage unit connected to the second IC chip, then accessing the first register, and activating the second control unit;

by the first control unit, further changing a setting of the first address conversion unit and the second address conversion unit so as to enable access to a second register in a memory space of the third IC chip necessary for activation;

by the first control unit, using the first, second, third, and fourth communication units to load an activation program for the third IC chip from the first storage unit connected to the first IC chip into a third storage unit connected to the third IC chip, then accesses the second register, and activate the third control unit, and after performing activation processing of the second and third control units, by the first control unit, changing a setting of the first address conversion unit and the second address conversion unit such that each IC chip is capable of communication.

8. The control method according to claim 7, further comprising after performing activation processing of the second and third control units, by the first control unit, notifying the second and third IC chips of communication permission and causing each IC chip to start communication.

9. The control method according to claim 7, wherein the first register includes a register configured to release the second control unit from reset.

10. The control method according to claim 7, wherein the first register includes a register configured to control a PLL control portion.

11. The control method according to claim 7, wherein the first register includes a register configured to control a memory control portion for the second storage unit, and wherein the control method further comprises, after accessing the memory control portion, by the first control unit, transferring an activation program for activating the second IC chip to the second storage unit.

12. The control method according to claim 7, wherein print data generated using the first, second, and third IC chips is transmitted to a print head.

13. An information processing apparatus comprising:
a first storage unit storing an activation program;
a first IC chip connected to the first storage unit;
a second IC chip connected to the first IC chip; and
a third IC chip connected to the second IC chip,
wherein the first IC chip comprises:
a first control unit configured to control the first IC chip;
a first communication unit configured to communicate with the second IC chip; and
a first address conversion unit configured to convert an address of access transferred from the first control unit into an address of a memory space for communication based on a setting,
the second IC chip comprises:
a second control unit configured to control the second IC chip;
a second communication unit configured to communicate with the first IC chip; and
a third communication unit configured to communicate with the third IC chip, the third IC chip comprises:
a third control unit configured to control the third IC chip;
a fourth communication unit configured to communicate with the second IC chip; and a second address conversion unit configured to convert an address of access transferred from the first control unit into an address of a memory space for communication based on a setting, wherein the first control unit makes a setting of the first address conversion unit so as to enable access to a first register in a memory space of the second IC chip necessary for activation, wherein the first control unit uses the first communication unit and the second communication unit to load an activation program for the second IC chip from the first storage unit into a second storage unit connected to the second IC chip, then accesses the first register, and activate the second control unit, wherein the first control unit further changes a setting of the first address conversion unit and the second address conversion unit so as to enable access to a second register in a memory space of the third IC chip necessary for activation, the first control unit uses the first, second, third, and fourth communication units to load an activation program for the third IC chip from the first storage unit connected to the first IC chip into a third storage unit connected to the third IC chip, then accesses the second register, and activate the third control unit, and wherein, after performing activation processing of the second and third control units, the first control unit changes a setting of the first address conversion unit and the second address conversion unit such that each IC chip is capable of communication.

14. The information processing apparatus according to claim 13, wherein, after performing activation processing of the second and third control units, the first control unit notifies the second and third IC chips of communication permission and causes each IC chip to start communication.

15. The information processing apparatus according to claim 13, wherein the first register includes a register configured to control a PLL control portion.

16. The information processing apparatus according to claim 13, wherein print data generated using the first, second, and third IC chips is transmitted to a print head.

* * * * *